United States Patent [19]

Morizumi

[11] Patent Number: 5,671,004
[45] Date of Patent: Sep. 23, 1997

[54] INTERNAL DRUM SCANNING TYPE IMAGE RECORDING APPARATUS

[75] Inventor: Yoshiaki Morizumi, Kyoto, Japan

[73] Assignee: Dainippon Screen Manufacturing Co., Ltd., Japan

[21] Appl. No.: 421,060

[22] Filed: Apr. 12, 1995

[30] Foreign Application Priority Data

Apr. 14, 1994 [JP] Japan ............................ 6-075979
Jun. 3, 1994 [JP] Japan ............................ 6-122717

[51] Int. Cl.$^6$ ........................................ B41J 2/47
[52] U.S. Cl. ........................................ 347/259; 347/260
[58] Field of Search ........................ 347/259, 260, 347/243, 129

[56] References Cited

U.S. PATENT DOCUMENTS 5,026,133  6/1991  Roddy et al. ................. 350/6.4
5,404,187  4/1995  Sterflinger .................... 347/263
5,506,394  4/1996  Plesko ........................... 250/353

*Primary Examiner*—Mark J. Reinhart
*Attorney, Agent, or Firm*—Ostrolenk, Faber, Gerb & Soffen, LLP

[57] ABSTRACT

An image recording apparatus in which at least one light beam scans over an inner surface of a cylindrical member to record an image on a recording medium held on the inner surface. A light beam from light beam outputting means advances along a central axis of a cylindrical member and enters an optical head which includes deflecting means and an imaging optical system. The deflecting means and the imaging optical system rotate as one unit. The nodal point of the imaging optical system is located at or close to a point on the central axis which is nearest a beam irradiation position on the recording medium. Hence, displacement of the imaging position is prevented which makes it possible to record a high quality image, even if the optical head wobbles.

19 Claims, 31 Drawing Sheets

F I G. 14
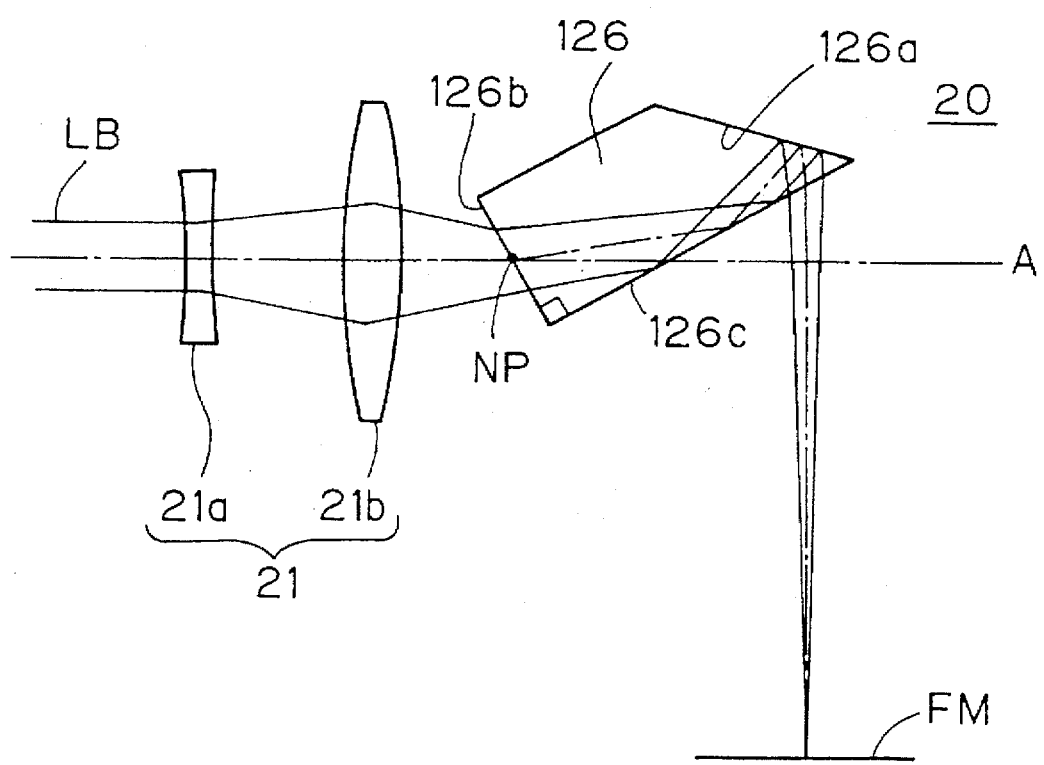

INTERNAL DRUM SCANNING TYPE IMAGE RECORDING APPARATUS

BACKGROUND OF THE INVENTION

1. Field of the Invention

The present invention relates to an internal drum scanning type image recording apparatus in which at least one light beam is scanned over a recording medium such as a photosensitive material which is held on an inner surface of a drum member so that a desired image is recorded on the recording medium.

2. Description of the Background Art

FIG. 28 is a schematic perspective view of a conventional image recording apparatus of an internal drum scanning type. In the conventional image recording apparatus, a photosensitive material FM is held on an inner surface of a drum (not shown). Inside the drum, an imaging lens 1 and a pentaprism 2 are arranged on a central axis A of the drum.

The pentaprism 2 includes an incident surface 2a at which a light beam LB enters the pentaprism 22 and a surface 2b which extends perpendicular to the incident surface 2a as shown in FIG. 29. The light beam LB passing through the imaging lens 1 impinges upon the incident surface 2a and enters the drum along the central axis A of the drum. Reflected at two reflection surfaces 2c and 2d within the drum, the light beam LB becomes a deflected light beam which crosses the incident light beam LB at 90 degrees and emerges from the surface 2b toward the photosensitive material FM.

A motor M is linked to the pentaprism 2. When the motor M is driven, the pentaprism 2 rotates around the central axis A, whereby the light beam is scanned over the photosensitive material FM and a desired image is recorded on the photosensitive material FM.

When rotates, the pentaprism 2 sometimes wobbles at an angle of θ with respect to the central axis A (FIG. 30). Since the pentaprism 2 inherently maintains an angular relationship between an incident light beam and an emergent light beam constant (i.e., 90 degrees) despite a change in the incident angle of the incident light beam with respect to the incident surface 2a, the light beam LB is nevertheless deflected 90 degrees by the pentaprism 2 and irradiated upon the photosensitive material FM as in a case where the pentaprism 2 does not wobble (FIG. 29).

Still, wobble of the pentaprism 2 displaces an imaging position along the direction parallel to the central axis A by an amount Δ1 which corresponds to the angle θ. The displacement Δ1 is expressed as:

$$\Delta 1 = \frac{L1}{n} \times \theta$$

where an optical length within the pentaprism 2 is L1 and a refractive index of the pentaprism 2 is n.

Thus, in the conventional image recording apparatus, the imaging position is shifted from a desired position because of wobble of the pentaprism 2 which serves as deflecting means, thereby deteriorating the quality of an image recorded on the photosensitive material FM.

The problem above is not unique to rotation of only the pentaprism 2. The problem occurs when the imaging lens 1 and the pentaprism 2 are rotated as one unit as shown in FIG. 31.

The problem occurs not only when the imaging lens 1 is disposed on the incident side with respect to the pentaprism 2 but also when the imaging lens 1 is disposed between the pentaprism 2 and the photosensitive material FM (FIG. 32).

A similar problem occurs when the pentaprism 2 is replaced with a right-angle prism 3 (FIG. 33) or a mirror unit 4 (FIG. 34) which is formed by combining a plurality of mirrors 4a and 4b. For example, the right-angle prism 3 displaces the imaging position by an amount Δ2 when wobbles at an angle of θ as shown in FIG. 33.

$$\Delta 2 = 2 \times r \times \theta$$

The symbol r expresses an inner diameter of the drum. When the mirror unit 4 wobbles at an angle of θ, the imaging position is displaced by an amount Δ3 as shown in FIG. 34.

$$\Delta 3 = L2 \times \theta$$

The symbol L2 expresses an optical distance from a point P1 at which a light beam is reflected by the mirror 4a to a point P2 at which the light beam finally crosses the central axis A.

SUMMARY OF THE INVENTION

The present invention is directed to an internal drum scanning type image recording apparatus for scanning at least one light beam over an inner surface of a cylindrical member and exposing a recording medium which is held on the inner surface to record an image on the recording medium, the cylindrical member having a central axis. This apparatus comprises: light beam outputting means for outputting a light beam along the central axis of the cylindrical member into the inner space of the cylindrical member; an optical head including deflecting means for deflecting the light beam from the light beam outputting means toward the inner surface of the cylindrical member and an imaging optical system for focusing the light beam from the light beam outputting means on the recording medium, the imaging optical system being disposed so that a nodal point of the imaging optical system is located at or close to a point on the central axis which is nearest a beam irradiation position on the recording medium, the imaging optical system and the deflecting means being disposed inside the cylindrical member in such a manner that the deflecting means and the imaging optical system are rotatable as one unit about the central axis; and optical head driving means for rotating the optical head about the central axis and scanning the light beam from the optical head over the recording medium.

Preferably, the deflecting means is formed by a prism or a mirror unit which has an even number of reflection surfaces to deflect the light beam from the light beam outputting means approximately 90 degrees.

The deflecting means may be formed by a reflection mirror and art afocal optical system which has a magnification of 1.

In an aspect of the present invention, the deflection means is a pentaprism assembly which is formed by combining a plurality of pentaprisms, the deflection means being disposed on the central axis so that a boundary between the pentaprisms is located on a principal ray of the light beam from the light beam outputting means.

In an another aspect of the present invention, the deflection means is a prism having a plurality of reflection surfaces and an afocal optical system having a magnification of 1, the prism being located on the central axis so that the reflection surfaces separate the light beam from the light beam outputting means into a plurality of light beams and direct the separated light beams toward different directions.

In further another aspect of the present invention, the deflection means is a prism assembly which is formed by combining a plurality of right-angle prisms, the deflection means being disposed on the central axis so that a boundary between the right-angle prisms is located on a principal ray of the light beam from the light beam outputting means, the right-angle prisms each having an even number of reflection surfaces.

In still another aspect of the present invention, the deflection means is a pentaprism assembly which is formed by combining a plurality of pentaprisms and the light beam outputting means includes a plurality of light beam outputting units which are disposed so that light beams from the light beam outputting units each enter the different pentaprisms.

In an another aspect of the present invention, the deflection means is a prism having a plurality of reflection surfaces and an afocal optical system having a magnification of 1 and the light beam outputting means includes a plurality of light beam outputting units which are disposed so that light beams from the light beam outputting units each enter the different reflection surfaces.

In further another aspect of the present invention, the deflection means is a prism assembly which is formed by combining a plurality of right-angle prisms and the light beam outputting means includes a plurality of light beam outputting units which are disposed so that light beams from the light beam outputting units each enter the different right-angle prisms, the right-angle prisms each having an even number of reflection surfaces.

In the present invention, the deflecting means for deflecting the light beam which enters the drum member along the central axis of the drum member is formed by a prism or a mirror unit which includes a plurality of reflection surfaces and which deflects the light beam from the light beam outputting means approximately by 90 degrees. Hence, even if the optical head wobbles when rotates, an angular relationship between an incident light beam and an emergent light beam is maintained constant. The light beam from the deflecting means is displaced parallel by wobble.

However, in the image recording apparatus of the present invention, since the nodal point of the imaging optical system is at or close to a point NP on the central axis A which is nearest a beam irradiation position on the photosensitive material FM and since the imaging optical system and the deflecting means rotate as one unit around the central axis of the drum member, wobble of the optical head only causes the imaging optical system to be inclined about the nodal point. Hence, no displacement of the imaging position in the direction of the central axis is created. In short, displacement of the imaging position is prevented which makes it possible to record a high quality image, even if the optical head wobbles.

Accordingly, it is an object of the present invention to offer an internal drum scanning type image recording apparatus in which an imaging position is not displaced despite wobble of an optical head, and hence, in which a high quality image is recorded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a view of an optical head of an internal drum scanning type image recording apparatus according to an eighth preferred embodiment of the present invention;

DESCRIPTION OF THE PREFERRED EMBODIMENTS

A. First Preferred Embodiment

Figure 1:
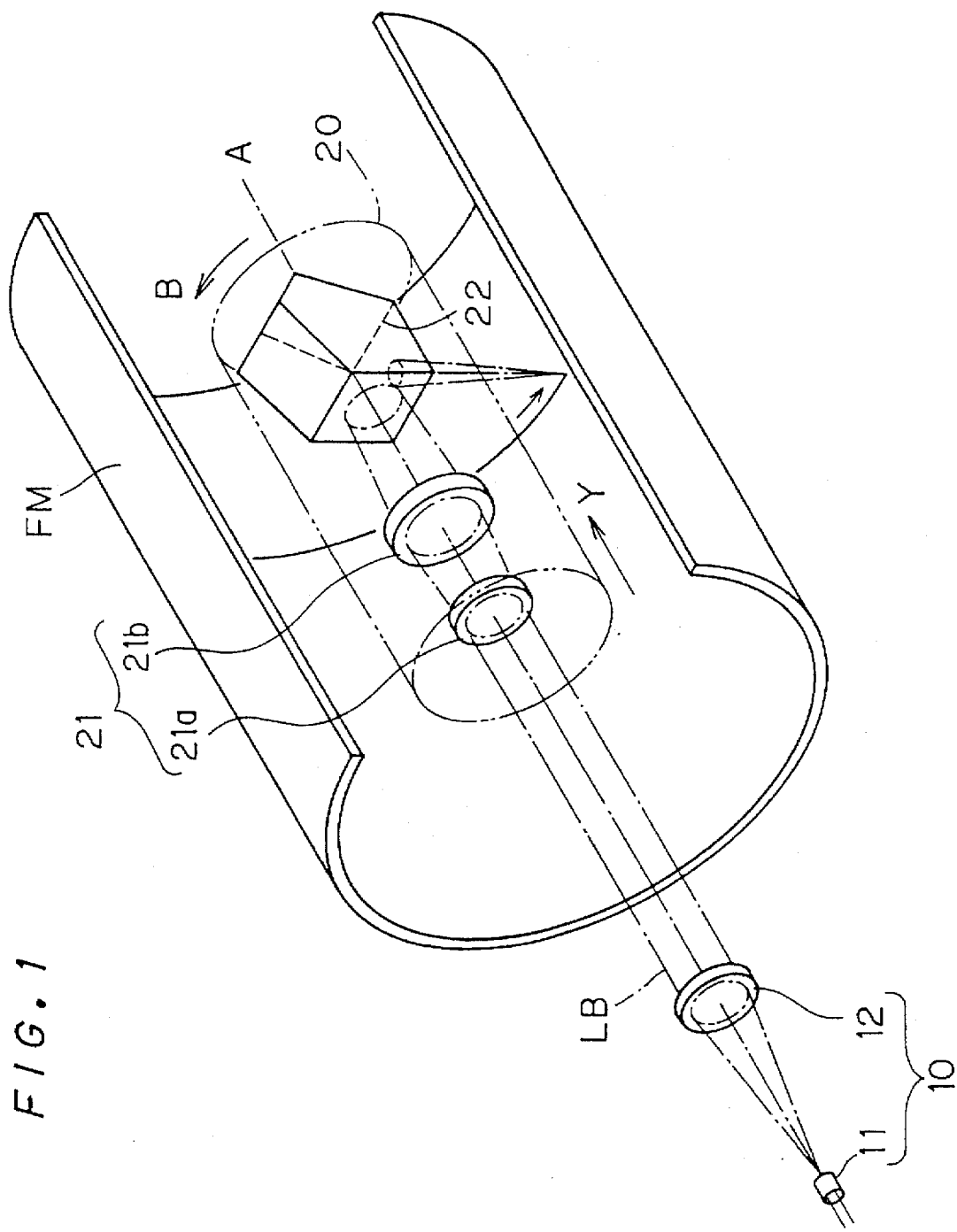
FIG. 1 is a schematic perspective view of an internal drum scanning type image recording apparatus according to a first preferred embodiment of the present invention.
Figure 2:
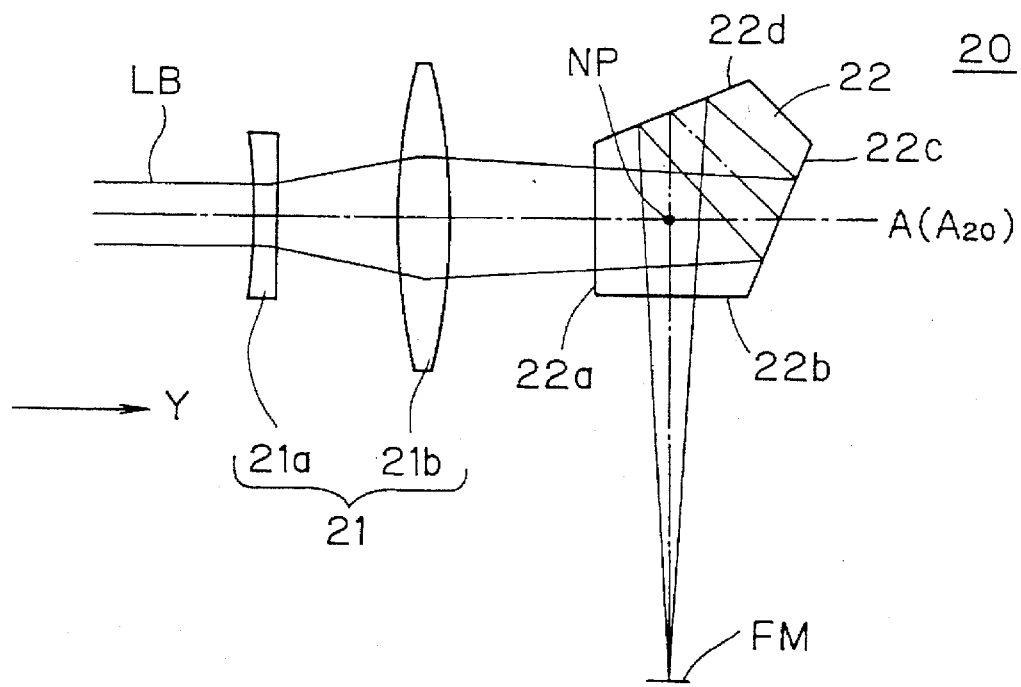
FIG. 2 is a view showing a structure of an optical head of the image recording apparatus of FIG. 1.

FIG. 1 is a schematic perspective view of an internal drum scanning type image recording apparatus according to a first preferred embodiment of the present invention. FIG. 2 is a view showing a structure of an optical head which is disposed in the image recording apparatus. In this internal drum scanning type image recording apparatus, a photosensitive material FM, or a recording medium, is held on a cylindrical drum (not shown).

The image recording apparatus also comprises a light beam outputting unit 10 which is formed by a semiconductor laser 11 and a collimating lens 12 as shown in FIG. 1. In accordance with a signal from a control part (not shown) which controls the entire apparatus, the semiconductor laser 11 is directly modulated and driven. That is, the semiconductor laser 11 is driven to emit a light beam and the light beam is irradiated through a certain path (described later) upon the photosensitive material FM if a pixel currently scanned is where recording is needed, and the semiconductor laser 11 is driven not to emit a light beam if a pixel currently scanned is where recording is not needed. The light beam LB emitted from the semiconductor laser 11 in this manner is shaped by the collimating lens 12. A collimated light beam enters the drum along a central axis A of the drum. A light source of the light beam outputting unit 10 may be those which cannot be directly modulated such as a helium-neon laser and an argon laser. In this case, the light beam outputting unit 10 is formed by such a light source and a modulator which modulates a light beam from the light source, such as an audio-optical modulator. In addition, the semiconductor laser 11 may be replaced with an LED (light emitting diode).

An optical head 20 is mounted in the drum so as to be rotatable about the central axis A of the drum. In the optical head 20, an imaging optical system 21 which is formed by two lenses 21a and 21b and a pentaprism 22 which functions as deflecting means are disposed in this order in the direction in which the light beam LB propagates, i.e., in a direction Y in FIGS. 1 and 2.

In FIG. 2, the pentaprism 22 includes an incident surface 22a and a surface 22b which extend perpendicular to each other. The light beam LB entering the pentaprism 22 at the incident surface 22a is reflected successively at two inner reflection surfaces 22c and 22d. The light beam LB then emerges from the surface 22b of the pentaprism 22 toward the photosensitive material FM. The pentaprism 22 maintains an angle between the incident light beam and the emergent light beam always at 90 degrees.

The imaging optical system 21 is disposed so that the nodal point of the imaging optical system 21 is located at or close to a point NP on the central axis A which is nearest a beam irradiation position on the photosensitive material FM. With the nodal point located at such a position, the imaging optical system 21 focuses the light beam LB on the photosensitive material FM.

Figure 28:
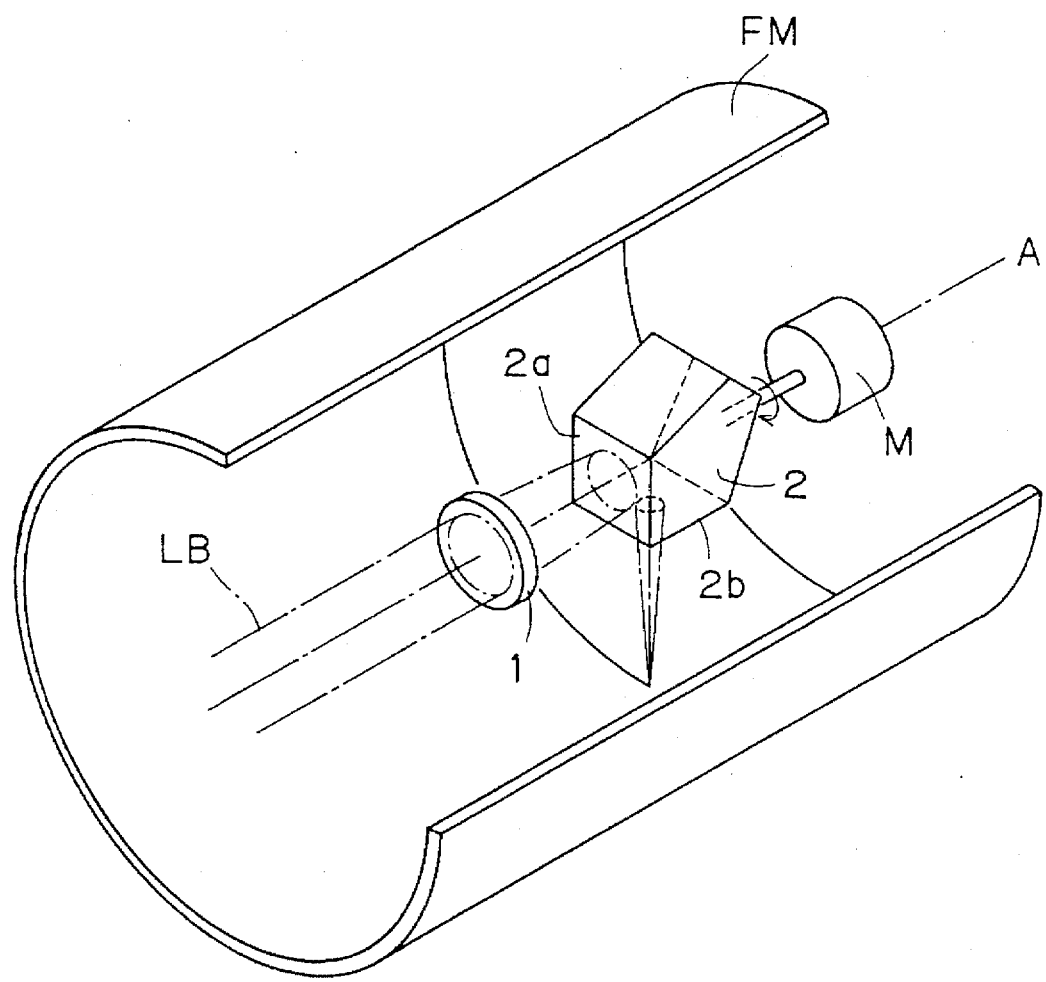
FIG. 28 is a perspective view of a conventional internal drum scanning type image recording apparatus.
Figure 29:
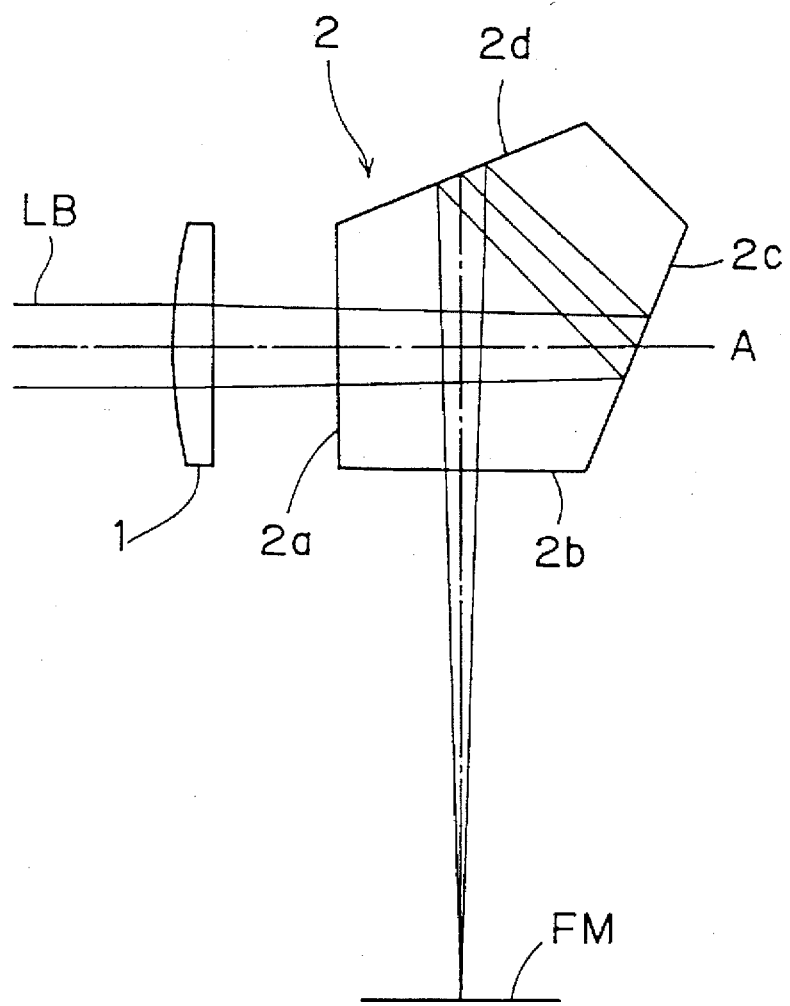
FIG. 29 is a view showing a structure of an optical head of the internal drum scanning type image recording apparatus of FIG. 28.
Figure 30:
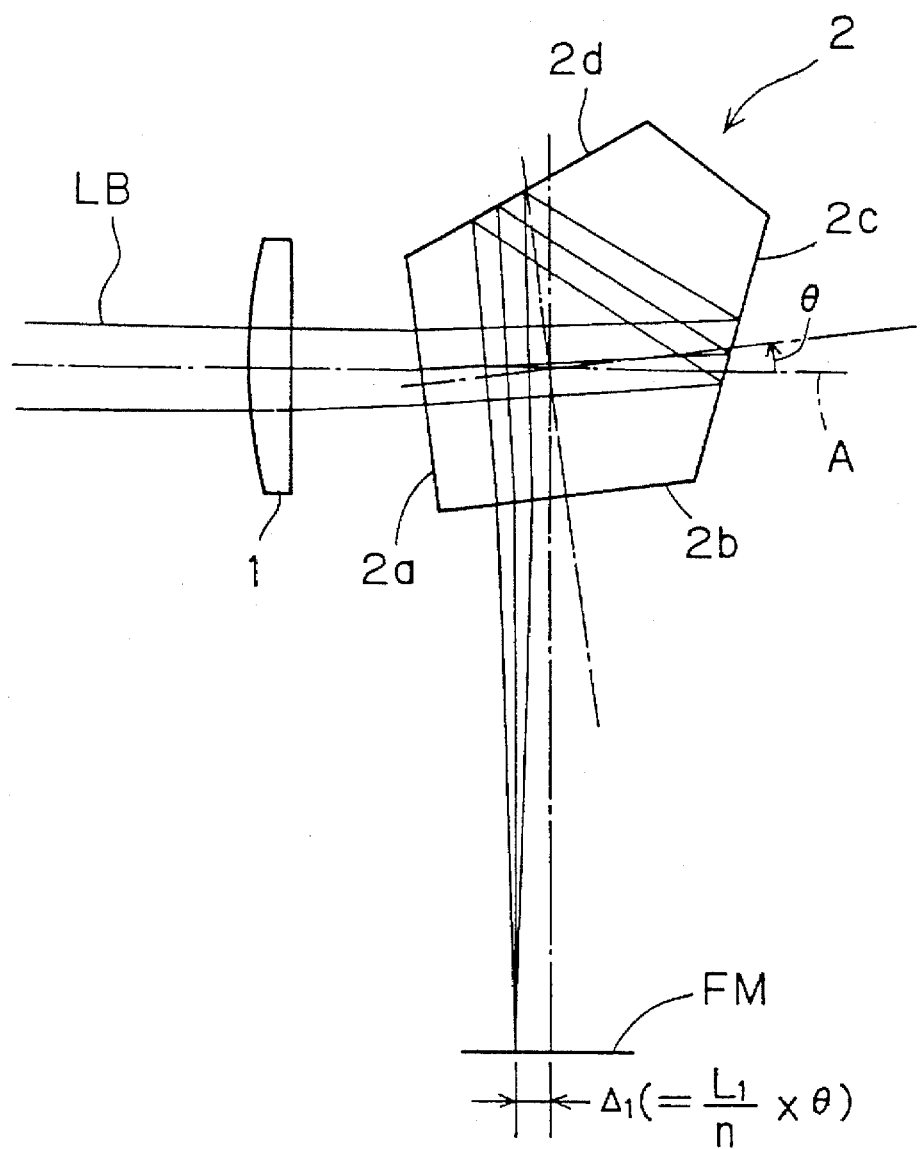
FIG. 30 is a view showing how a light beam propagates within the optical head of FIG. 29 when only a pentaprism wobbles.
Figure 31:
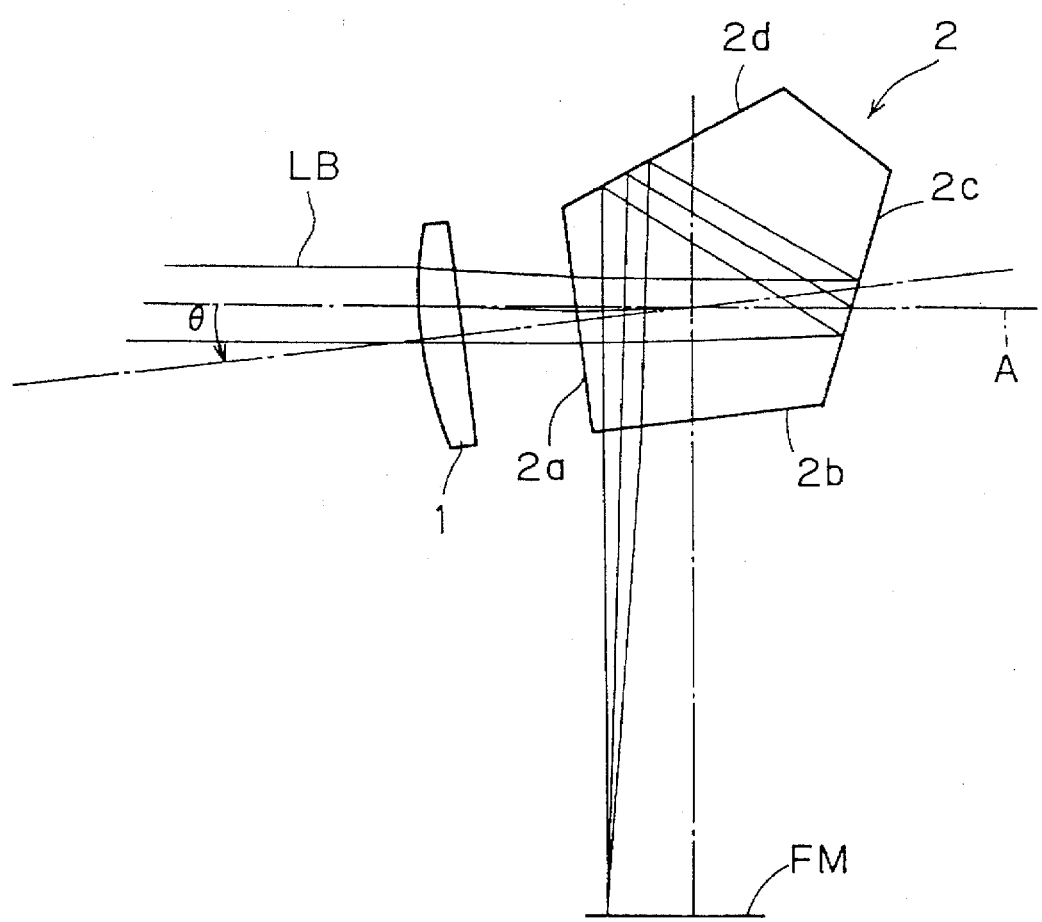
FIG. 31 is a view showing how a light beam propagates within the optical head of FIG. 29 when the entire optical head wobbles.
Figure 32:
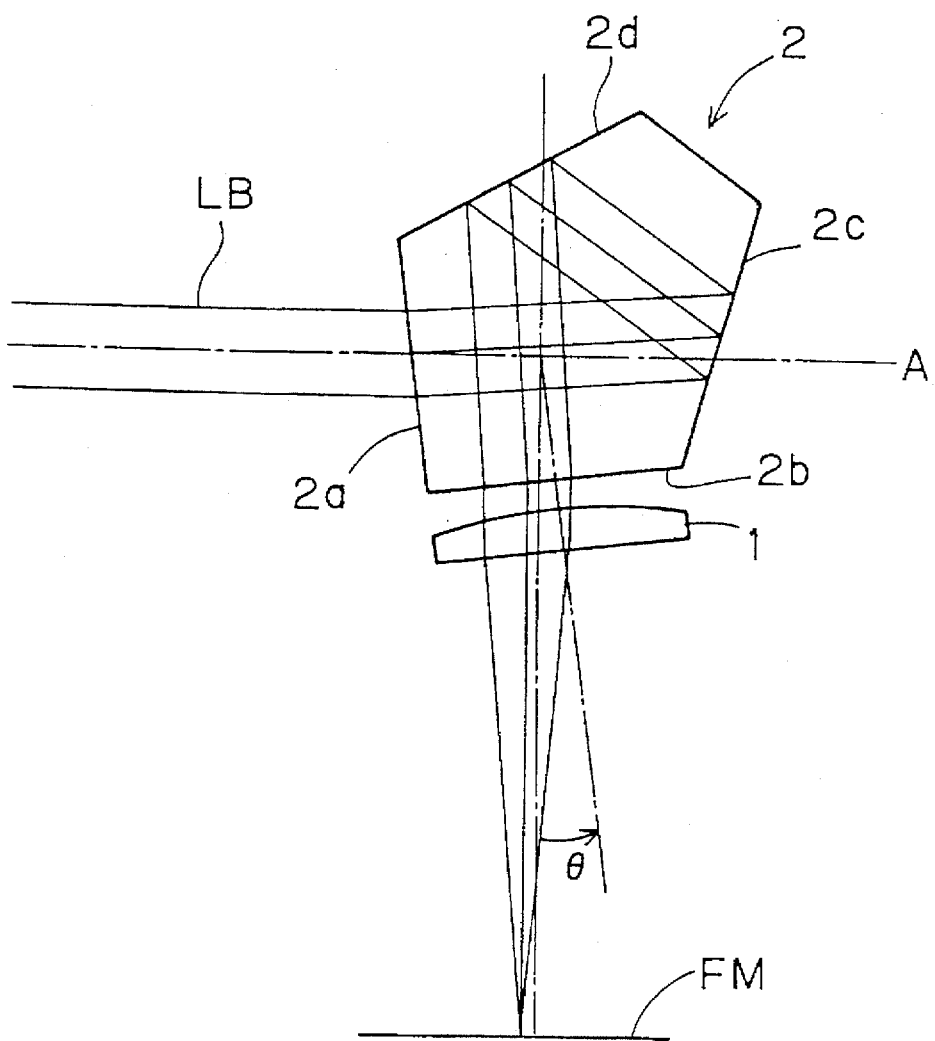
FIGS. 32 to 34 are views showing propagation of a light beam within a conventional optical head which has a different structure from the structure of FIG. 28.
Figure 33:
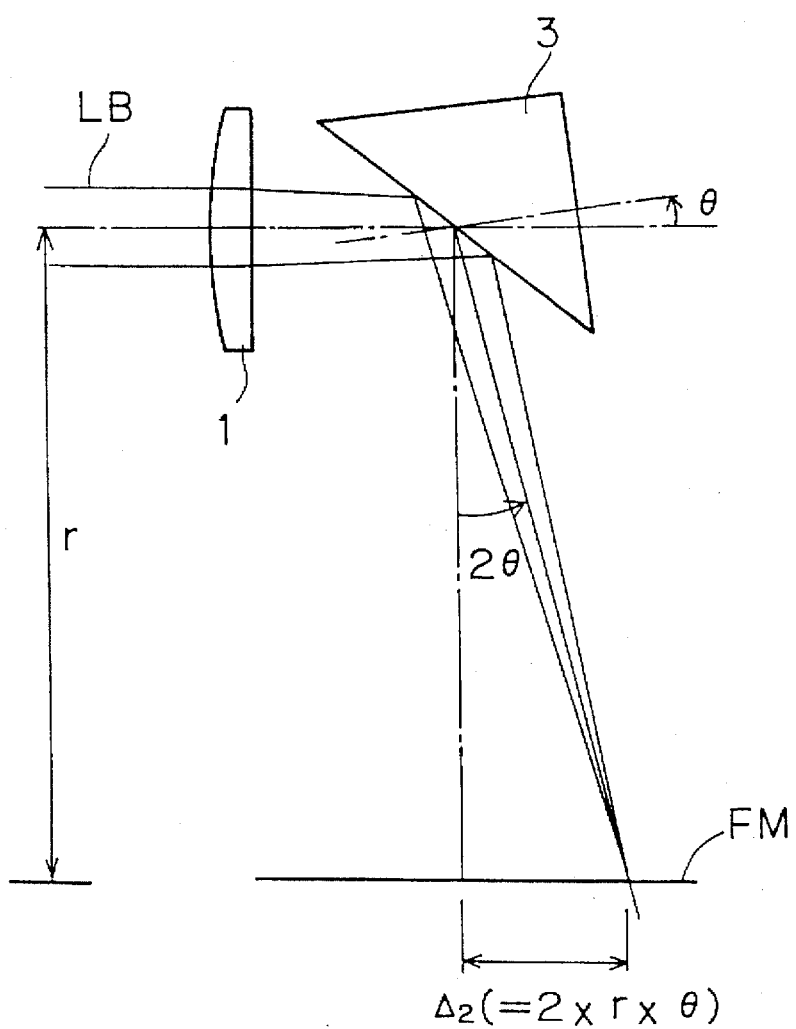
Figure 34:
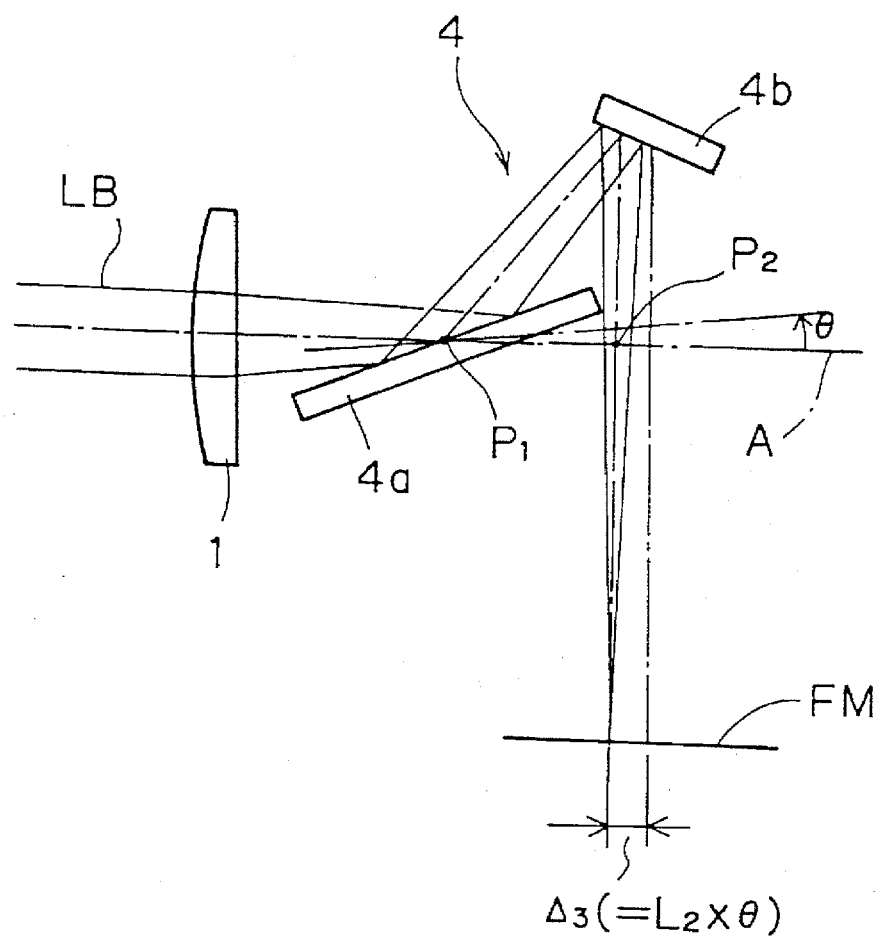

The optical head 20 having such a construction above is linked to an optical head drive part (which corresponds to the motor M of FIG. 28; not shown). The optical head drive part rotates the imaging optical system 21 and the pentaprism 22 as one unit in the direction of an arrow B in FIG. 1 about the central axis A, whereby the light beam from the optical head 20 sweeps over the photosensitive material FM.

The image recording apparatus further comprises a reciprocal movement mechanism (not shown) for reciprocally moving the optical head 20 and the photosensitive material FM relative to each other in the direction Y. A desired image is recorded on the photosensitive material FM by scanning the light beam over the photosensitive material FM in the manner above while moving the optical head 20 and the photosensitive material FM relative to each other in the direction Y.

Figure 3:
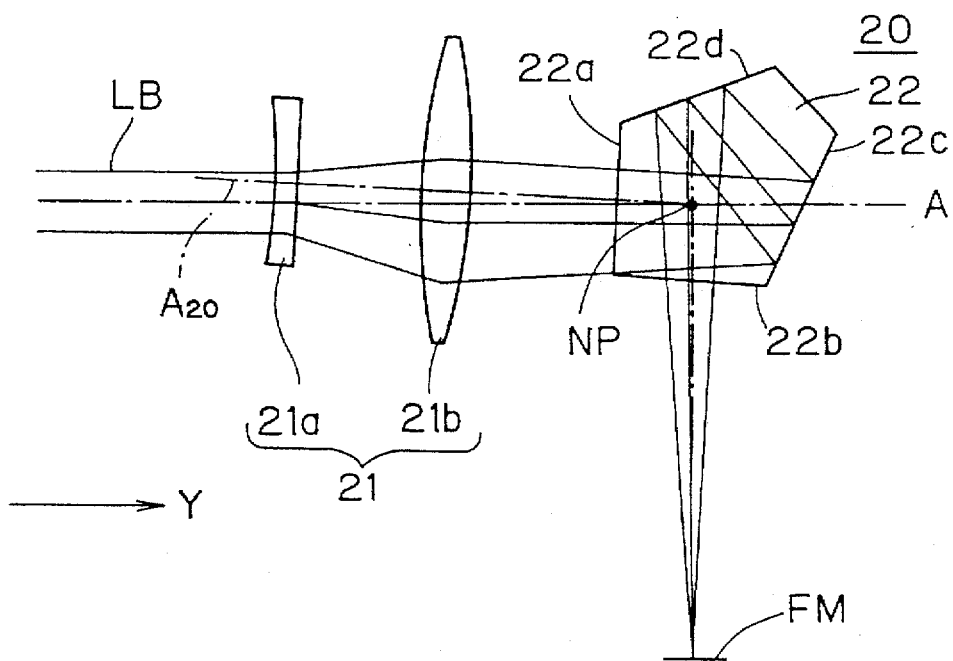
FIG. 3 is a view showing how a light beam propagates within the optical head of FIG. 2 when the optical head wobbles.

Now, effects created in the image recording apparatus will be described with respect to two cases, one in which the optical head 20 does not wobble (FIG. 2) and the other in which the optical head 20 wobbles (FIG. 3).

A description will be given first on the case in which the optical head 20 does not wobble with reference to FIG. 2. When the optical head 20 does not wobble, an optical axis A20 of the optical head 20 perfectly coincides with the central axis A of the drum so that the light beam LB from the light beam outputting unit 10 passes through the imaging optical system 21 and advances toward the pentaprism 22 along the central axis A (optical axis A20). The light beam LB entering the pentaprism 22 at the incident surface 22a is then internally reflected at the inner reflection surfaces 22c and 22d to emerge from the surface 22b of the pentaprism 22 toward the photosensitive material FM. The light beam LB is finally imaged on the photosensitive material FM.

In contrast, when the optical head 20 wobbles, the optical axis A20 of the optical head 20 is inclined with respect to the central axis A, thereby tilting the imaging optical system 21 about the nodal point NP as shown in FIG. 3. However, the direction of the light beam passing the nodal point NP remains unchanged while the angle of the light beam passing the nodal point NP with respect to the optical axis A20 changes. Similar to where there is no wobble, the light beam passing the nodal point NP is nevertheless focused at the same imaging position on the photosensitive material FM. In other words, having such a structure as above, the optical head 20 focuses the light beam passing the nodal point NP always at a predetermined position even if the imaging optical system 21 moves on an imaginary spherical surface which is radially traced about the nodal point NP. Thus, in the first preferred embodiment, the imaging position is always the same even if the optical head 20 wobbles, and hence, a quality image is recorded on the photosensitive material FM. The effect above is created not only where the optical head 20 wobbles about the nodal point NP as described above. The imaging position remains almost unchanged even when the optical head 20 wobbles about other point off the nodal point NP toward the central axis A, thereby promising a similar effect.

In the first preferred embodiment, since the lenses 21a and 21b are disposed on the rotation axis of the optical head 20, namely, the central axis A, a torque is small and balance of rotation is excellent.

B. Second Preferred Embodiment

Figure 4:
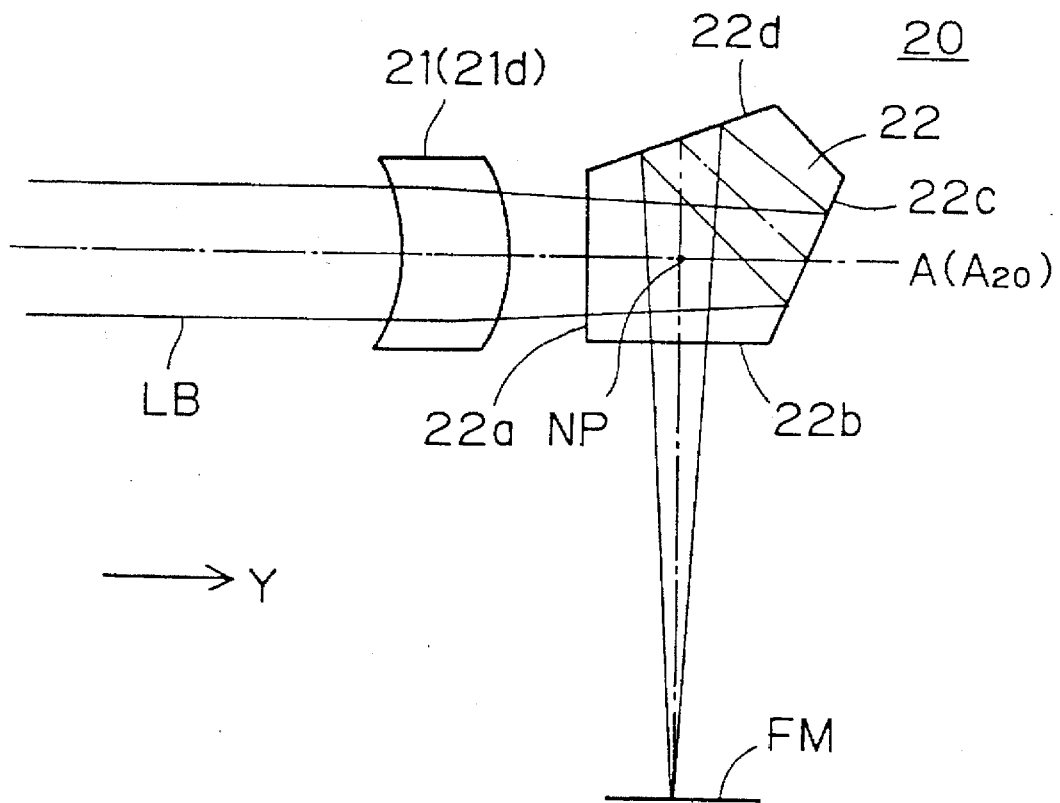
FIG. 4 is a view showing a structure of an optical head of an internal drum scanning type image recording apparatus according to a second preferred embodiment of the present invention.

FIG. 4 is a schematic perspective view of an internal drum scanning type image recording apparatus according to a second preferred embodiment of the present invention. A structure of an optical head of the image recording apparatus is shown in FIG. 4. In the second preferred embodiment, instead of forming the imaging optical system 21 by the two lenses 21a and 21b, the imaging optical system 21 is formed by a meniscus lens 21d which has a convex surface directed toward the pentaprism 22. The image recording apparatus of the second preferred embodiment is otherwise the same as the image recording apparatus of the first preferred embodiment.

The image recording apparatus of the second preferred embodiment in which the imaging optical system 21 is formed by only one meniscus lens 21d creates an effect similar to that of the first preferred embodiment.

C. Third Preferred Embodiment

Figure 5:
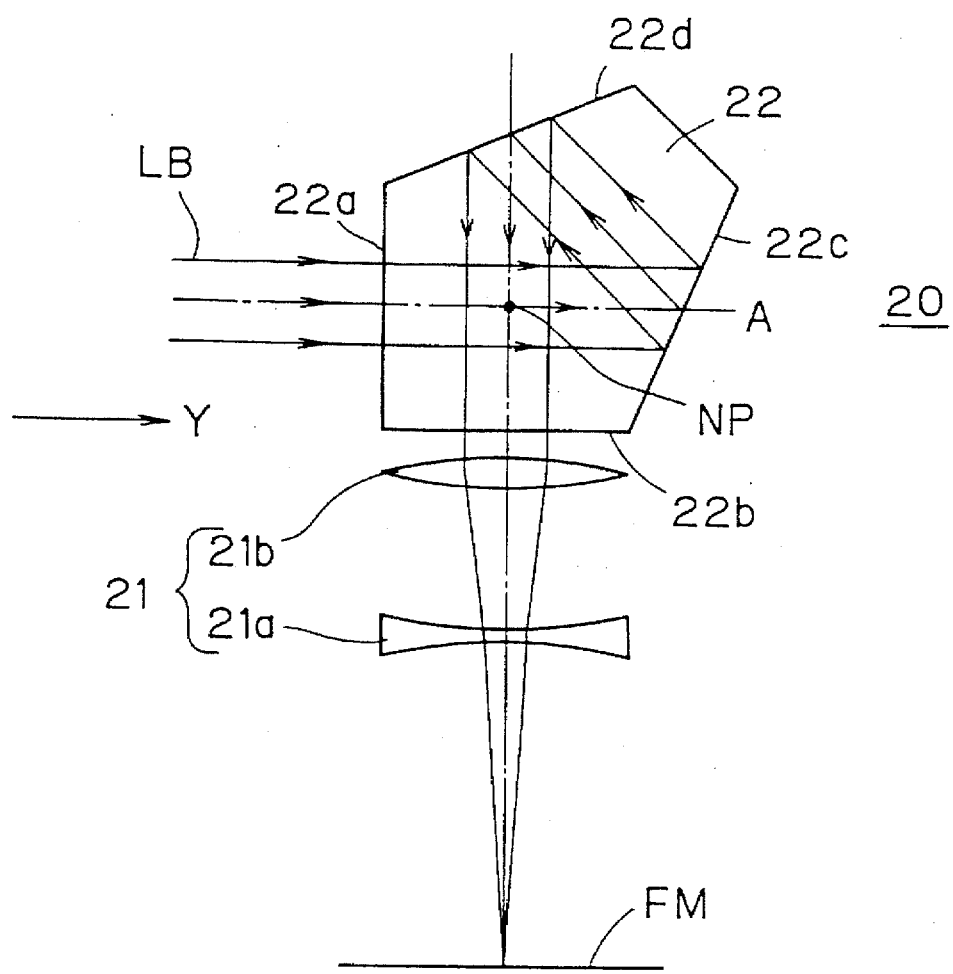
FIG. 5 is a view showing a structure of an optical head of an internal drum scanning type image recording apparatus according to a third preferred embodiment of the present invention.
Figure 6:
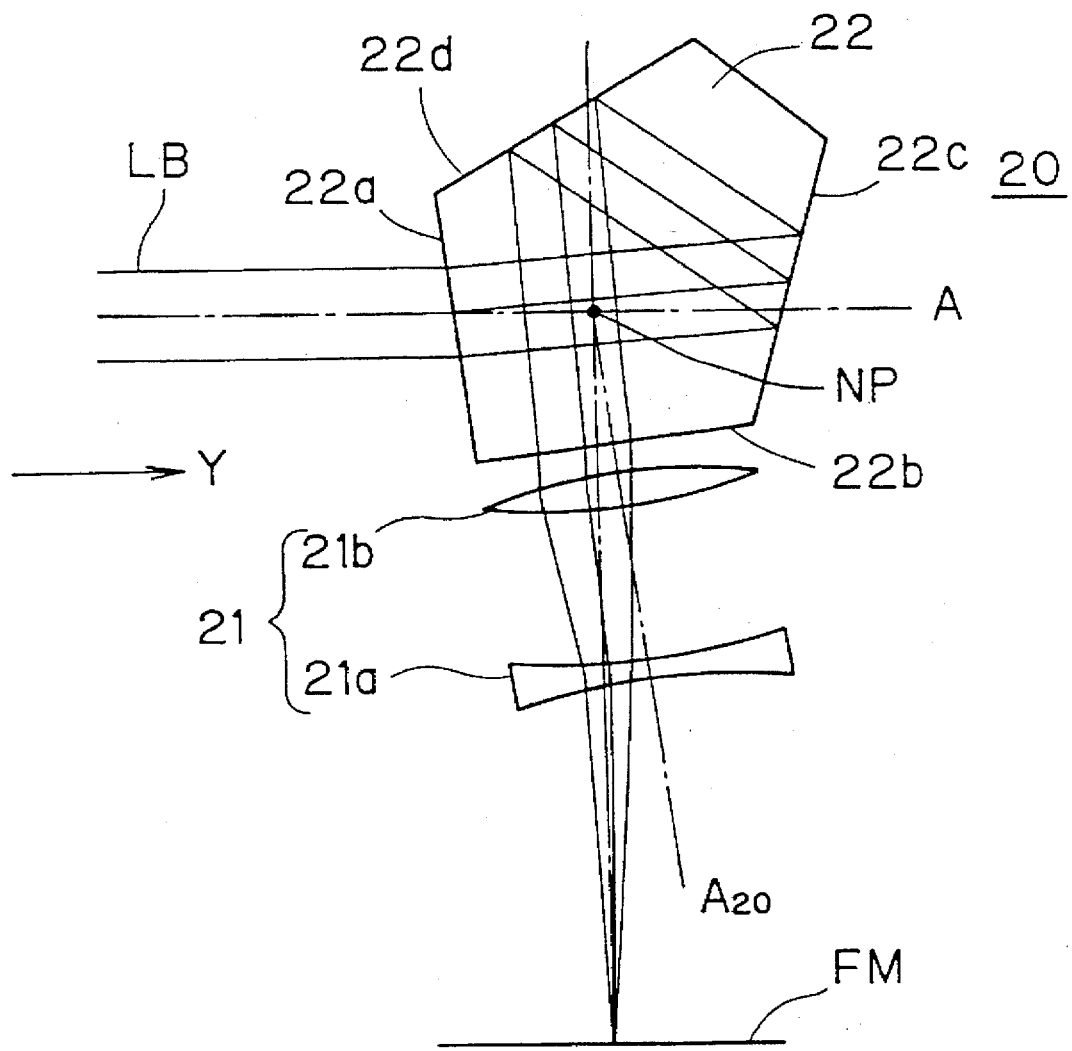
FIG. 6 is a view showing how a light beam propagates within the optical head of FIG. 5 when the optical head wobbles.

Although the imaging optical system 21 is arranged between the light beam outputting unit 10 and the pentaprism 22 in the first preferred embodiment, the imaging optical system 21 may be located between the pentaprism 22 and the photosensitive material FM as shown in FIG. 5. The optical head 20 having such a structure also creates an effect similar to those described above. More precisely, even when the optical head 20 wobbles, the light beam LB impinging upon the pentaprism 22 along the central axis A is deflected at a constant angle as shown in FIG. 6. The light beam LB then passes the nodal point NP and emerges from the surface 22b of the pentaprism 22 toward the photosensitive material FM. As understood by comparing FIGS. 5 and 6, the emergent light beam is shifted toward the central axis A. However, since the imaging optical system 21 is inclined about the nodal point NP, the light beam LB passing the nodal point NP is focused at a predetermined imaging position despite wobble. As a result, a high quality image is recorded on the photosensitive material FM.

As described above, the imaging optical system 21 and the pentaprism 22 rotate as one unit about the central axis A with the nodal point NP of the imaging optical system 21 located at or close to the point on the central axis which is nearest a beam irradiation position on the recording medium, or the photosensitive material FM, independently of the order in which the imaging optical system 21 and the pentaprism 22 are arranged. Hence, wobble associated with deflection of the light beam is prevented from displacing the imaging position, making it possible to record a high quality image.

In the third preferred embodiment, since the light beam passing through the pentaprism 22 is a parallel beam, a refractive index of the pentaprism 22 is not influential.

D. Fourth Preferred Embodiment

Figure 7:
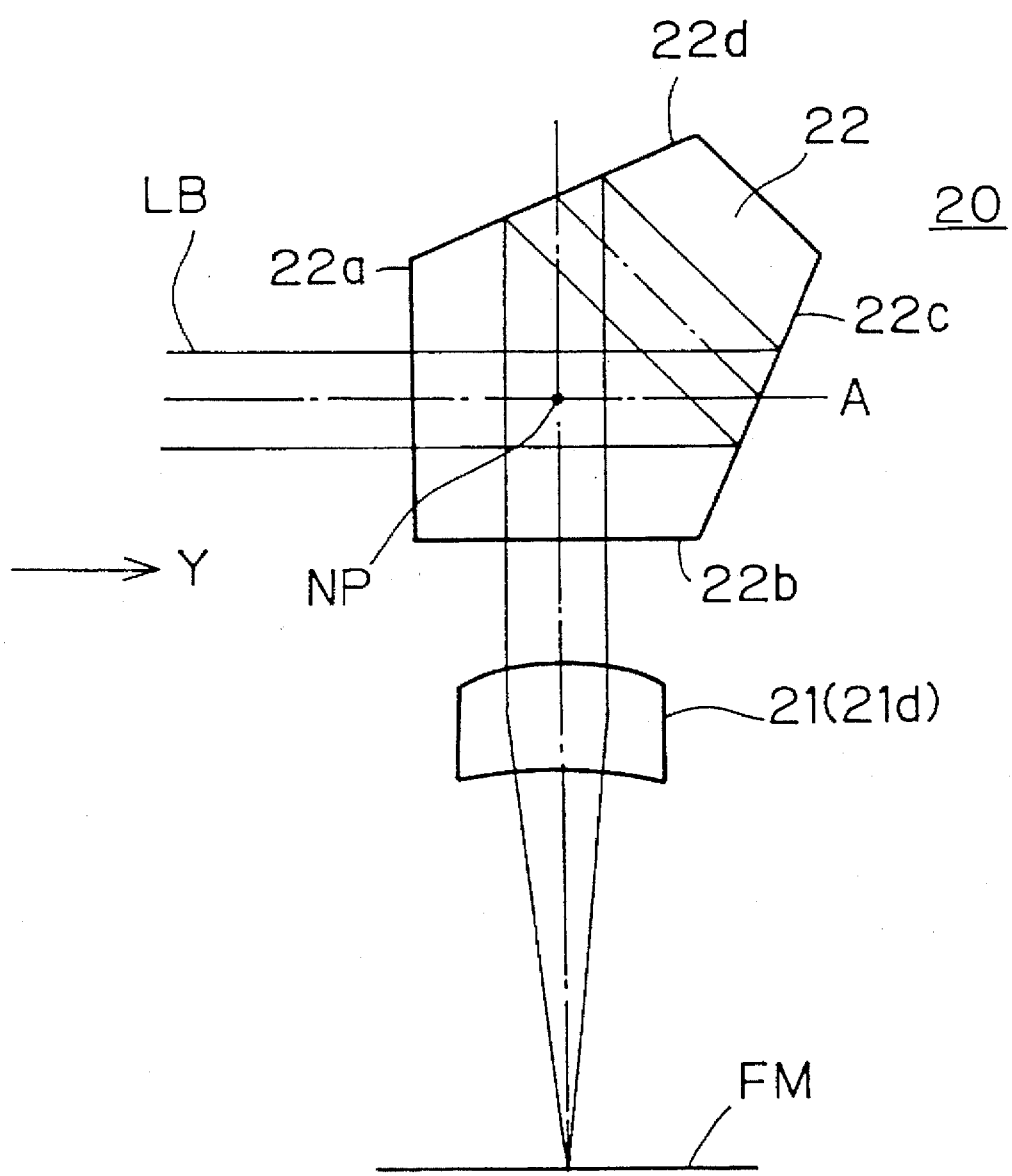
FIG. 7 is a view showing a structure of an optical head of an internal drum scanning type image recording apparatus according to a fourth preferred embodiment of the present invention.

FIG. 7 is a schematic perspective view of an internal drum scanning type image recording apparatus according to a fourth preferred embodiment of the present invention. A structure of an optical head of the image recording apparatus is shown in FIG. 7. In the fourth preferred embodiment, instead of forming the imaging optical system 21 by the two lenses 21a and 21b, the imaging optical system 21 is formed by a meniscus lens 21d which has a convex surface directed toward the pentaprism 22. The image recording apparatus of the fourth preferred embodiment is otherwise the same as the image recording apparatus of the third preferred embodiment.

The image recording apparatus of the fourth preferred embodiment in which the imaging optical system 21 is formed by only one meniscus lens 21d creates an effect similar to that of the preferred embodiments above.

E. Fifth Preferred Embodiment

Figure 8:
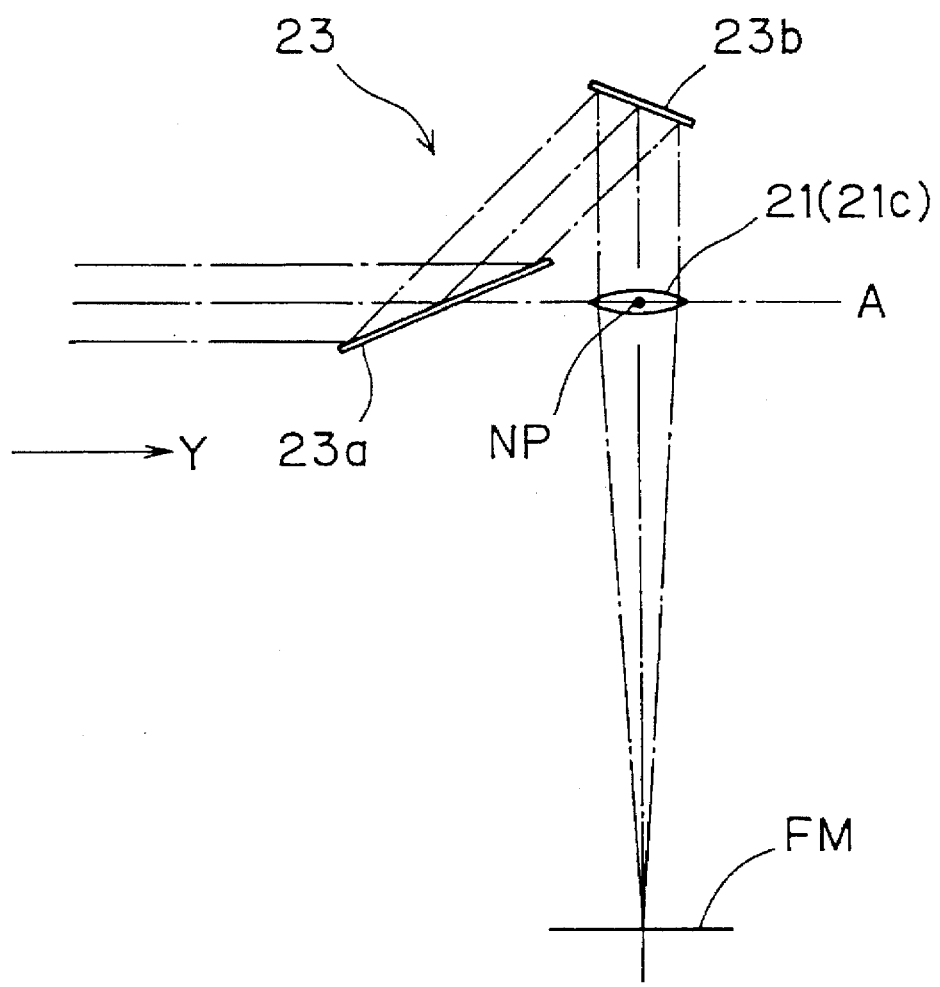
FIG. 8 is a view showing a structure of an optical head of an internal drum scanning type image recording apparatus according to a fifth preferred embodiment of the present invention.

As shown in FIG. 8, the imaging optical system 21 may be formed by a single lens 21c while a mirror unit 23 which consists of two reflection mirrors 23a and 23b may serves as deflecting means instead of the pentaprism 22. An effect similar to heretofore described is created also in the fifth preferred embodiment. Since there is a space created at the center of wobble of the optical head 20, the imaging optical system 21 may be disposed at the center of wobble of the optical head 20 as modification of the fifth preferred embodiment. In this modification, the imaging optical system 21 may be formed by one convex lens as in the fifth preferred embodiment (FIG. 8).

F. Sixth Preferred Embodiment

Figure 10:
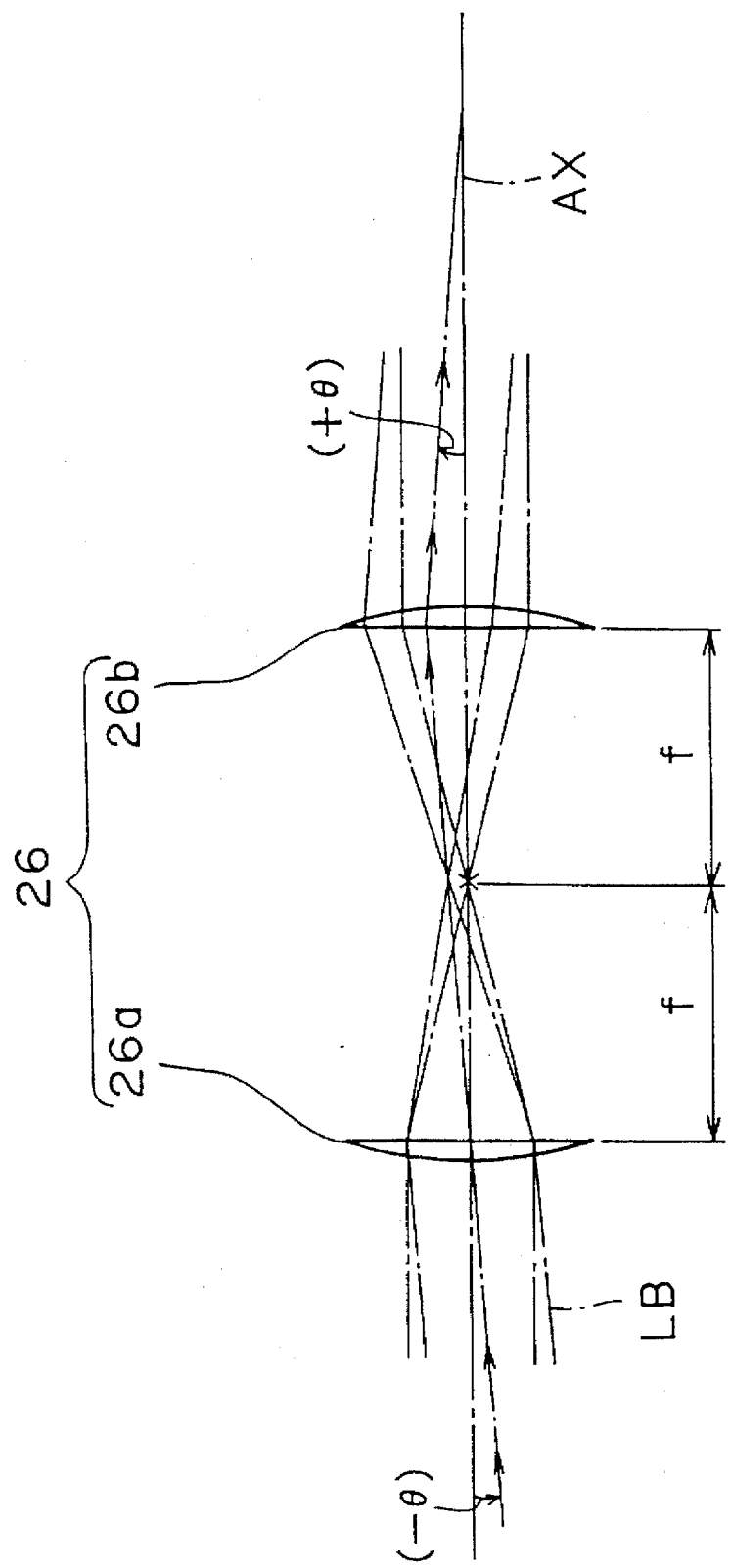
FIG. 10 is a view of an afocal optical system of the optical head of FIG. 9 having a magnification of 1.
Figure 11:
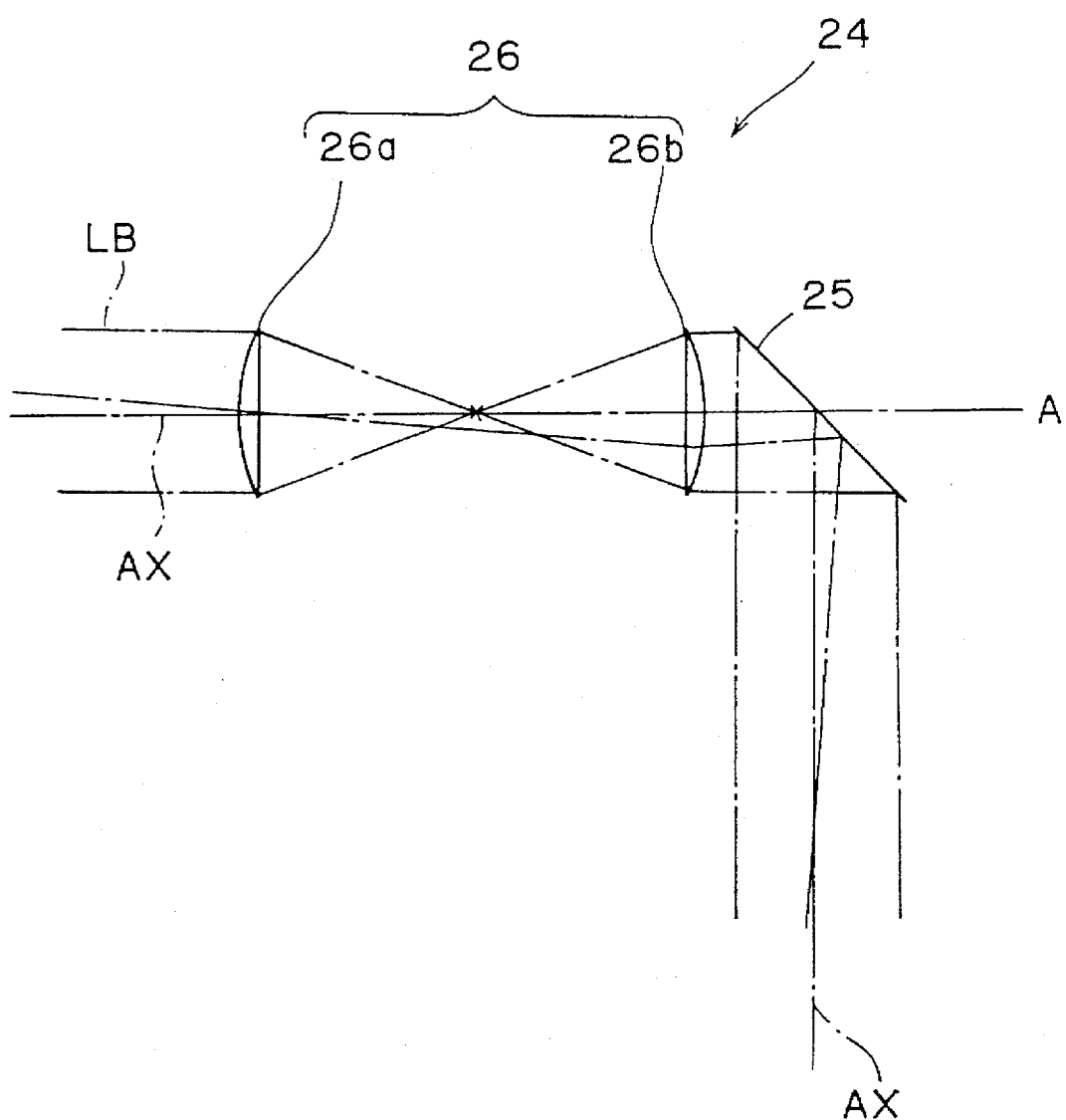
FIG. 11 is a view of a deflecting part of the optical head of FIG. 9.

The pentaprism 22 may be replaced with deflecting means 24 which is formed by a reflection mirror 25 and an afocal optical system 26 which has a magnification of 1. This will be described in detail below with reference to FIGS. 9 to 11. In the afocal optical system 26 forming the deflecting means 24, lenses 26a and 26b having the same focal length f are arranged with a certain distance (2f) away from each other. Due to this structure, when the light beam LB from the light beam outputting unit 10 impinges upon the afocal optical system 26 at an angle of (−θ) with respect to an optical axis AX of the afocal optical system 26, the light beam emerges from the afocal optical system 26 at an angle of (+θ) with respect to the optical axis AX of the afocal optical system 26 as shown in FIG. 10. That is, the light beam LB entering the afocal optical system 26 at an angle θ emerges from the afocal optical system 26 at the same angle but in an opposite direction with respect to the optical axis AX. Hence, by reflecting the light beam from the afocal optical system 26 by the reflection surface which is inclined at 45 degrees to the central axis A (optical axis AX), even when the incident light beam is at an angle of (+θ) with respect to the optical axis AX, the light beam emerges from the afocal optical system 26 at an angle of (+θ) with respect to the optical axis AX toward the photosensitive material FM as shown in FIG. 11. As a result, independently of an angle of the light beam LB impinging upon the deflecting means 24, it is possible to maintain an angular relationship between the incident light beam into the deflecting means 24 and the emergent light beam from the deflecting means 24 constant as in the embodiments heretofore described (FIG. 11). That is, the deflecting means 24 which is formed by the afocal optical system 26 having a magnification of 1 and the reflection mirror 25 possesses a similar optical characteristic to the pentaprism 22 and the mirror unit 23.

Figure 9:
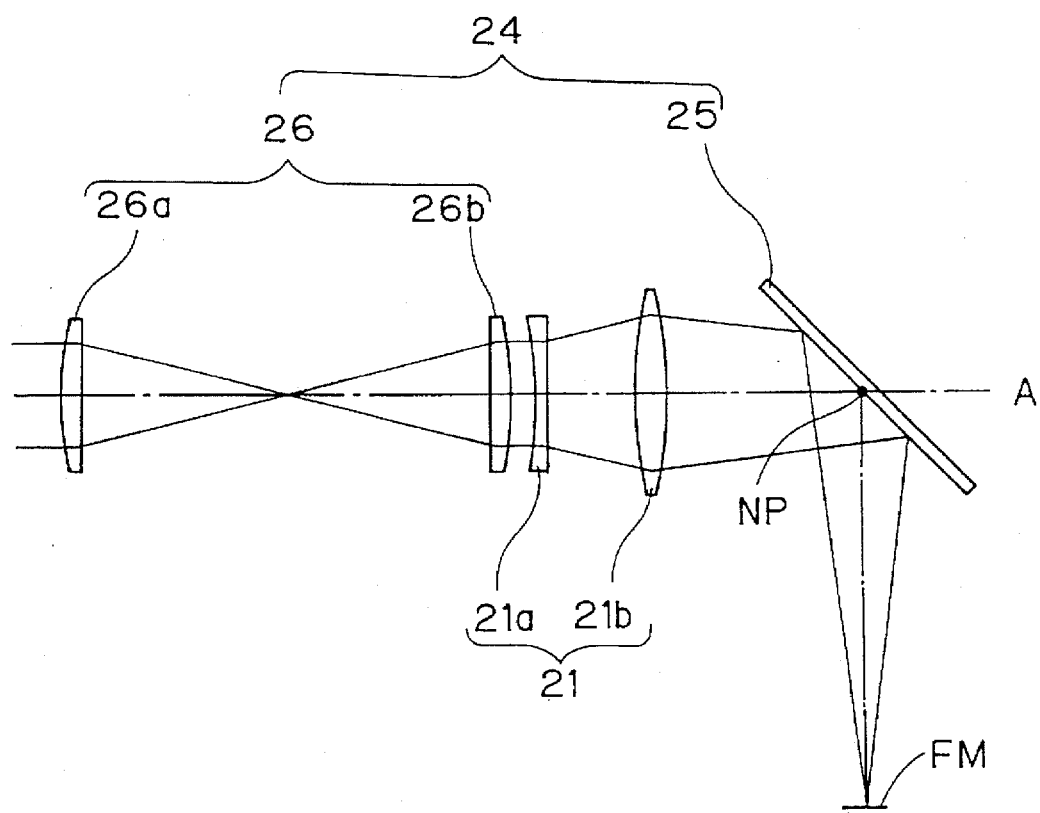
FIG. 9 is a view showing a structure of an optical head of an internal drum scanning type image recording apparatus according to a sixth preferred embodiment of the present invention.

In addition, since the optical head 20 of FIG. 9 is disposed so that the nodal point of the imaging optical system 21 is located at or close to a point NP on the central axis A which is nearest a beam irradiation position on the recording medium, or the photosensitive material FM, the imaging position is always the same even if the optical head 20 wobbles, and hence, a quality image is recorded on the photosensitive material FM as in the preferred embodiments described earlier.

The positional relationship between the reflection mirror 25 and the afocal optical system 26 is not limited to that shown in FIG. 9. Rather, the reflection mirror 25 may be disposed on the light beam outputting unit 10 side while the afocal optical system 26 may be disposed on the photosensitive material FM side. Alternatively, the reflection mirror 25 may be disposed between the lenses 26a and 26b which form the afocal optical system 26. Further, instead of forming the afocal optical system 26 by two single lenses 26a and 26b, the afocal optical system 26 may be formed by two lens groups each having a focal length of f, one including a plurality of lenses to replace the single lens 26a and/or the other including a plurality of lenses to replace the single lens 26b. The location of the imaging optical system 21 within the optical head 20 is optional.

G. Seventh Preferred Embodiment

Figure 12:
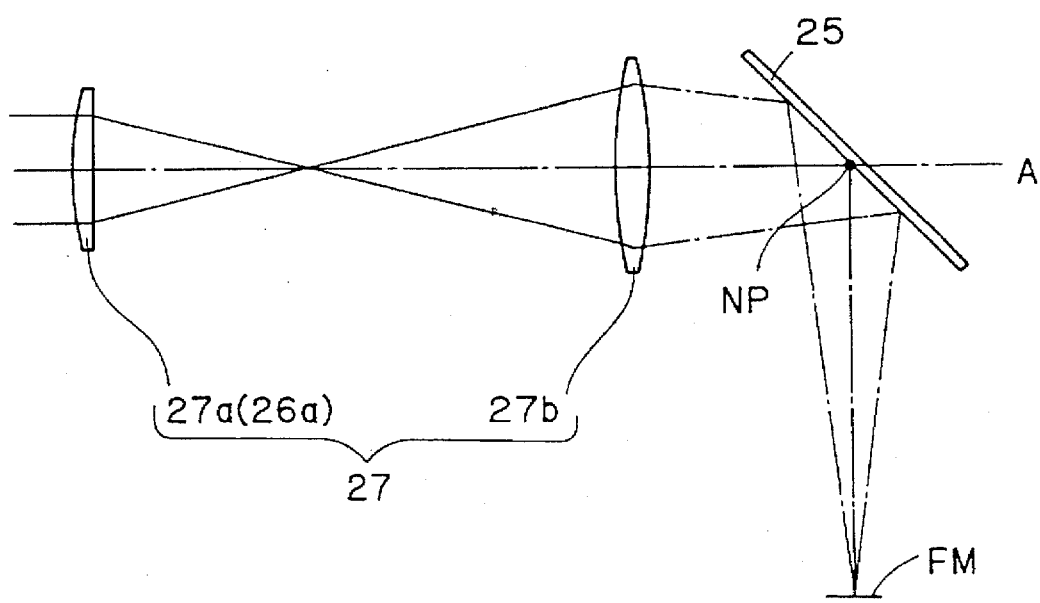
FIG. 12 is a view showing a structure of an optical head of an internal drum scanning type image recording apparatus according to a seventh preferred embodiment of the present invention.
Figure 13:
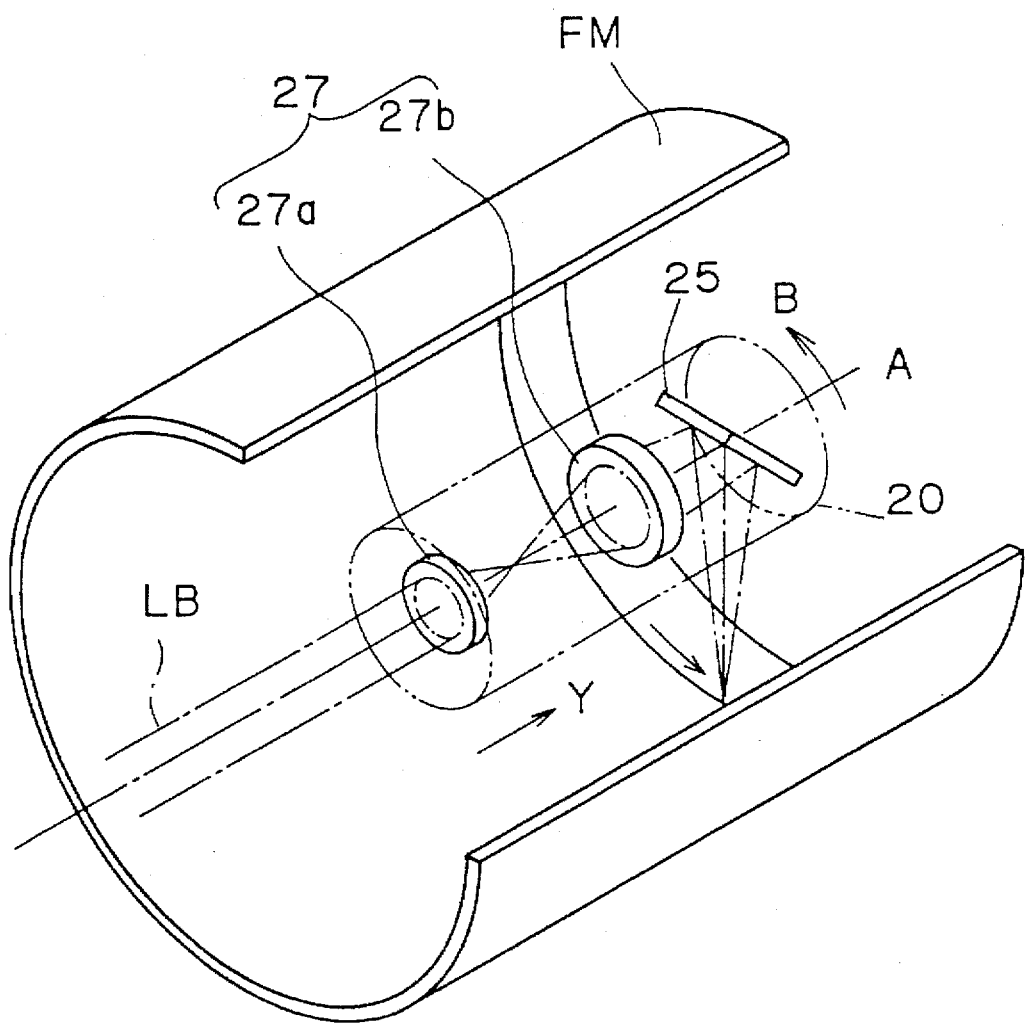
FIG. 13 is a schematic perspective view of the image recording apparatus of the seventh preferred embodiment of the present invention.

The lens 26b, one of the two lenses forming the afocal optical system 26 which is closer to the imaging optical system 21, and the imaging optical system 21 may be replaced with a single lens 27b which has optical characteristics of the lens group formed by the lens 26b and the imaging optical system 21, so that an imaging optical system 27 is formed (FIG. 12). Including such a structure, an image recording apparatus according to a seventh preferred embodiment is reduced in size while maintaining the same characteristic as that of the image recording apparatus of FIG. 9. A manufacturing cost is low (FIG. 13).

H. Eighth Preferred Embodiment

FIG. 14 is a view of an optical head of an internal drum scanning type image recording apparatus according to an eighth preferred embodiment of the present invention. A difference between the recording apparatuses of the eighth and the sixth preferred embodiments is that the afocal optical system 26 which has a magnification of 1 is replaced with a prism 126 of FIG. 15. The image recording apparatus of the eighth preferred embodiment is otherwise the same as the image recording apparatus of the sixth preferred embodiment. More particularly, in the eighth preferred embodiment, the deflecting means is formed by the prism 126 alone, and the light beam LB is scanned from the light beam outputting unit 10 when the optical head 20 formed by the imaging optical system 21 and the prism 126 is rotated about the rotation axis (i.e, central axis A) by the optical head drive part (not shown).

Figure 15:
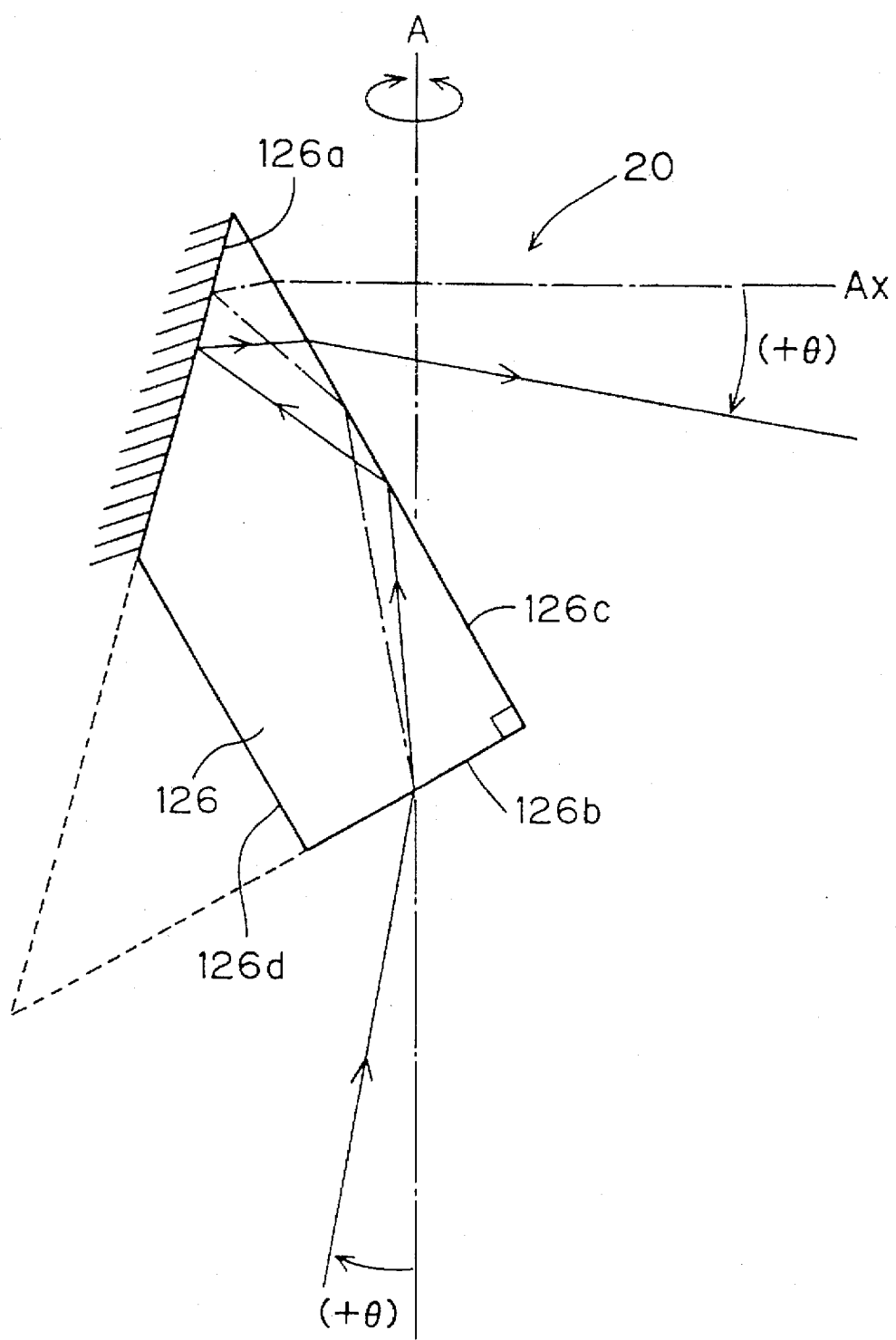
FIG. 15 is an enlarged view of a prism which forms the optical head of FIG. 14.

As shown in FIG. 15, the prism 126 has a similar characteristic to the afocal optical system 26. The light beam from the light beam outputting unit 10 impinges upon an incident surface 126b of the prism 126 at an angle of (+θ) with respect to the optical axis AX. The light beam is then totally reflected successively at a surface 126c and a reflection surface 126a within the prism 126 to emerge from the surface 126c of the prism 126. The emergent light beam leaving the prism 126 is oriented at an angle of (+θ) with respect to the optical axis AX. Hence, the optical head 20 formed by the prism 126 and the reflection surface 126a of the prism 126 has a similar optical characteristic to the afore-described pentaprism. Thus, the eighth preferred embodiment creates a similar effect to the sixth preferred embodiment.

The eighth preferred embodiment using the prism 126 instead of the afocal optical system 26 promises a further effect. While it is essential that the focal lengths of the lenses 26a and 26b are precisely the same to form the afocal optical system 26 of the sixth preferred embodiment, the prism 126 inherently does not demand this. In addition, while it is sometimes necessary in the sixth preferred embodiment to adjust the positions of the lenses 26a and 26b after disposing the lenses 26a and 26b since a rear focal point of the lens 26a and a front focal point of the lens 26b must perfectly coincide with each other, such a problem does not occur in the eighth preferred embodiment which uses the prism 126. For this reason, the eighth preferred embodiment realizes a scanning optical system which is easier to adjust and less expensive to manufacture than in the sixth preferred embodiment.

The prism of the eighth preferred embodiment is obtained by cutting a portion (a dotted portion in FIG. 15) of a right-angle prism which has apex angles of 90 degrees, 45 degrees and 45 degrees. Since a cutting surface 126d of the prism 126 is not used to reflect a light beam, the prism 126 is accurately manufactured in an easy manner.

Figure 16:
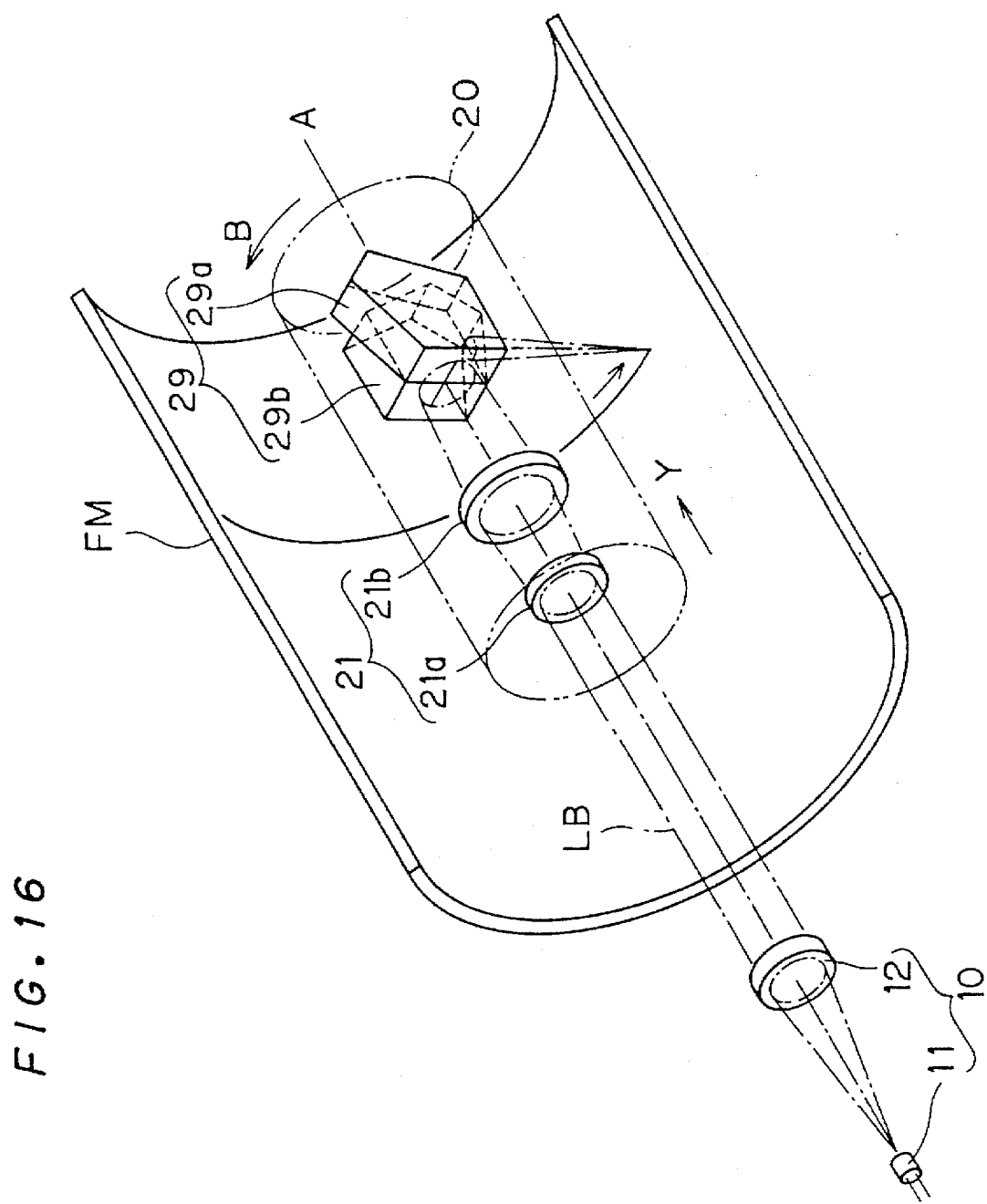
FIG. 16 is a schematic perspective view of an internal drum scanning type image recording apparatus according to a ninth preferred embodiment of the present invention.

I. Ninth Preferred Embodiment If modified to replace the pentaprism 22 with two pentaprisms 29a and 29b which are combined with each other to form a pentaprism assembly 29 which serves as deflecting means as shown in FIG. 16, the image recording apparatus of the first preferred embodiment functions as a multi-beam image recording apparatus.

The pentaprism assembly 29 is assembled so that a boundary between the two pentaprisms is located on a principal ray of the light beam LB. The pentaprism 29a reflects one semicircular beam of the light beam LB twice and the pentaprism 29b reflects the other semicircular beam of the light beam LB twice. Reflected in this manner, the light beams leave the pentaprisms 29a and 29b in opposite directions to each other.

Hence, an image recording speed is twice faster in the ninth preferred embodiment than where only one pentaprism is used.

The nodal point NP (the center of wobble of the optical head 20) is located at the same position as in the first preferred embodiment except that the nodal point NP is at the boundary between the two pentaprisms 29a and 29b.

J. Tenth Preferred Embodiment

Figure 17:
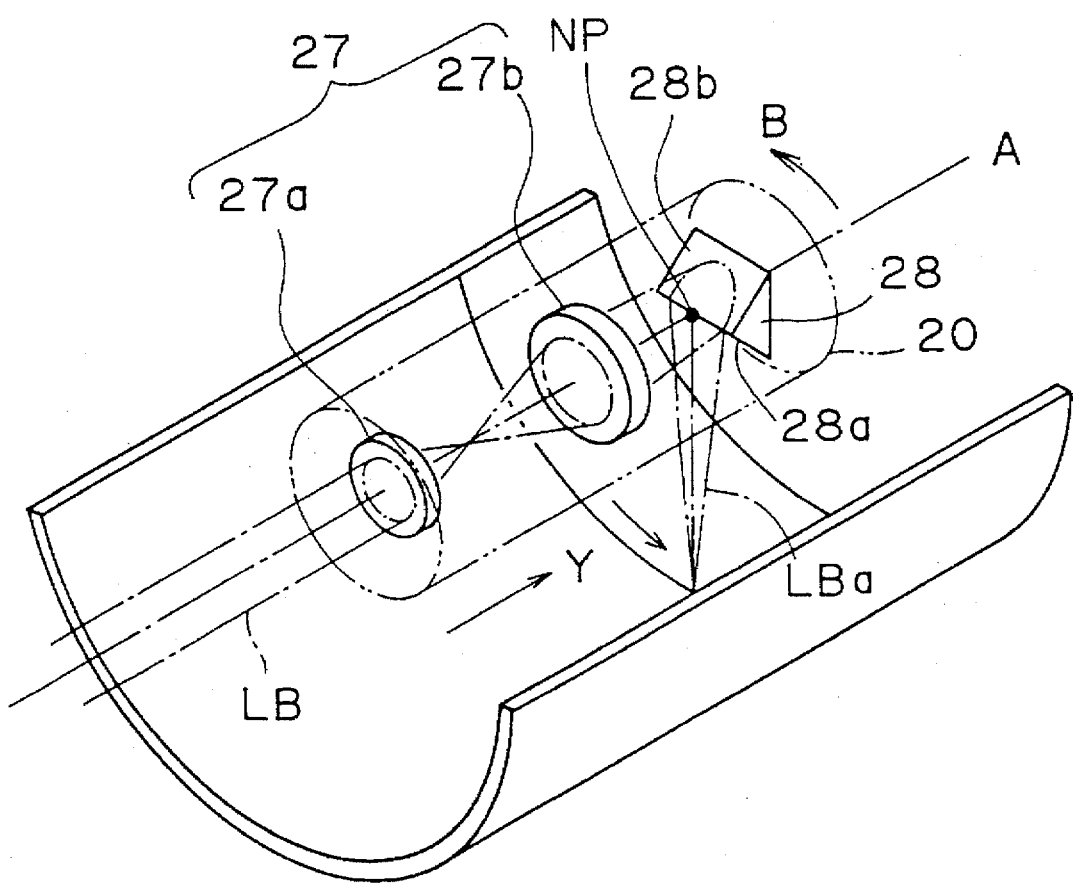
FIG. 17 is a schematic perspective view of an internal drum scanning type image recording apparatus according to a tenth preferred embodiment of the present invention.

A multi-beam image recording apparatus is realized by replacing the reflection mirror 25 of FIG. 13 with a prism 28 which has two reflection surfaces 28a and 28b as shown in FIG. 17. Light beam from the imaging optical system 27 enters the prism 28, thereby to be divided into two light beams. One light beam LBa from the reflection surface 28a advances toward a certain direction (i.e., downward in FIG. 17) while the other light beam from the reflection surface 28b advances toward an opposite direction to the light beam LBa (i.e., upward in FIG. 17). The two light beams are scanned one after another over the photosensitive material FM while the optical head 20 rotates once in the direction of an arrow B. Thus, the number of the light beams scanned per unit time and hence an image recording speed are increased, which makes it possible to efficiently record an image on the photosensitive material FM.

In the tenth preferred embodiment, the nodal point NP (the center of wobble of the optical head 20) is located at an intersection of the optical axis A (central axis A) and an apex line of the prism 28.

The lens 27b may be formed by three lenses as in the sixth preferred embodiment.

K. Eleventh Preferred Embodiment

Figure 18:
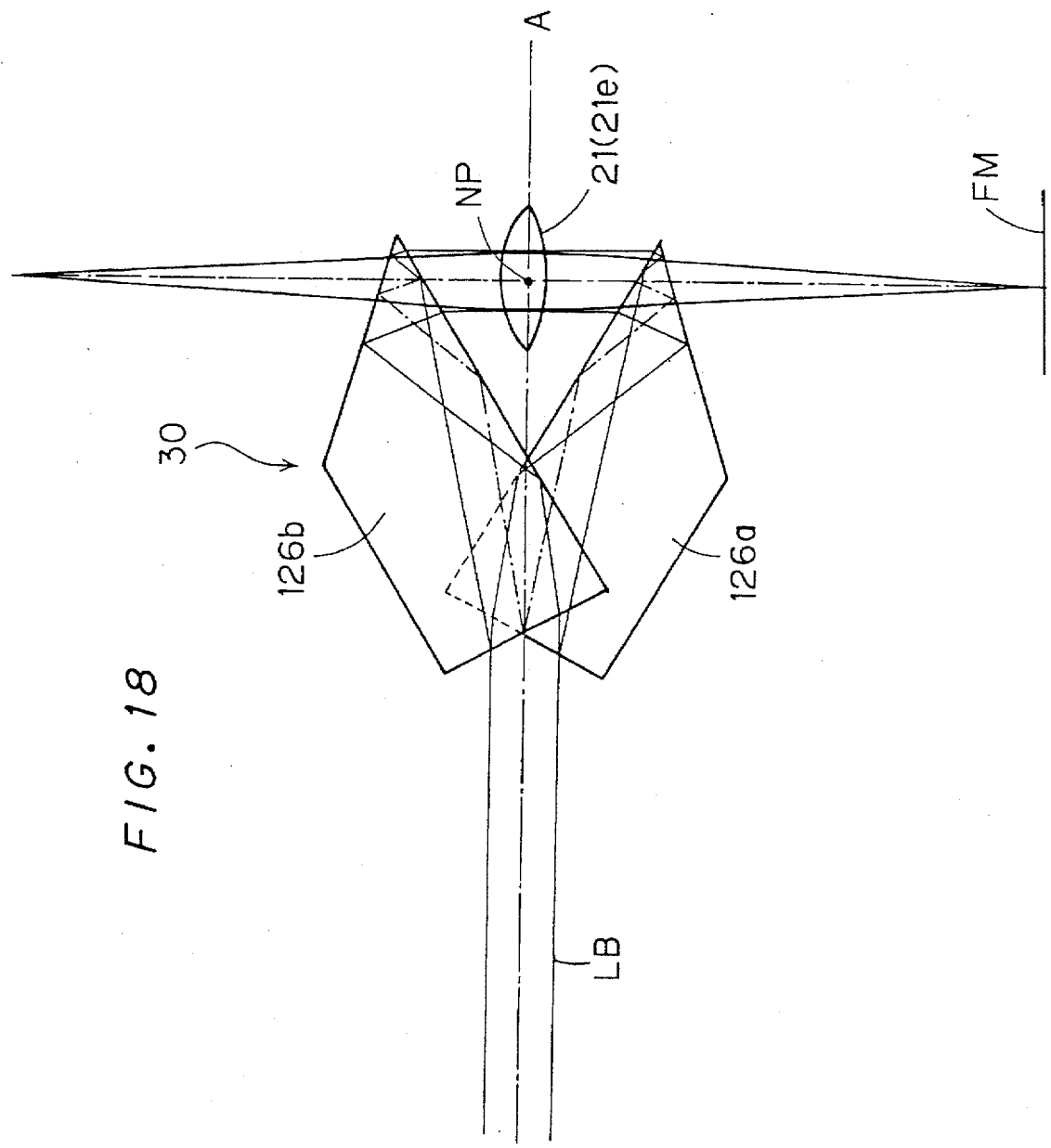
FIG. 18 is a view of an optical head of an internal drum scanning type image recording apparatus according to an eleventh preferred embodiment of the present invention.
Figure 19:
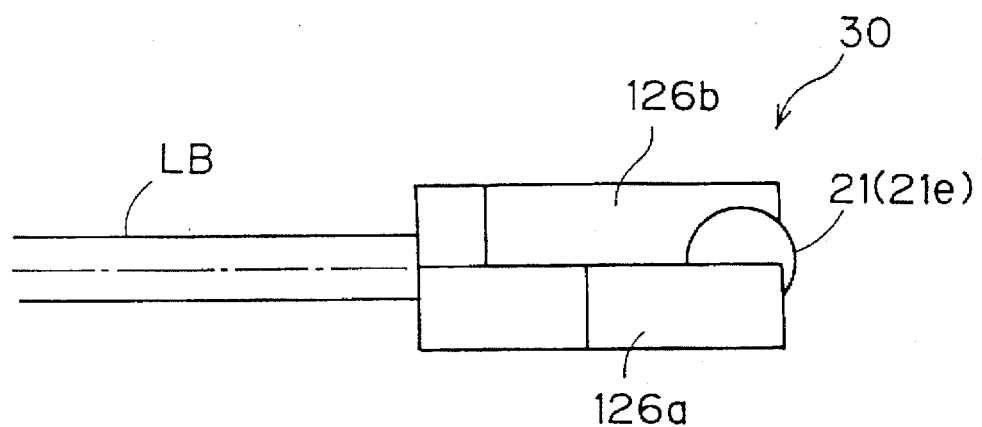
FIG. 19 is a plan view of the optical head of FIG. 19.

FIGS. 18 and 19 are views of an internal drum scanning type image recording apparatus according to an eleventh preferred embodiment of the present invention. In the eleventh preferred embodiment, rectangular prisms 126a and 126b are partially combined with each other to form a prism assembly 30. A boundary between the rectangular prisms 126a and 126b is located on a principal ray of the light beam LB from a light beam outputting unit (not shown). The light beam LB entering the prism assembly 30 is partially deflected by the right-angle prism 126a toward a certain direction (i.e., upward in FIGS. 18 and 19), The remaining portion of the incident light beam LB is deflected by the right-angle prism 126b toward in an opposite direction (i.e., downward in FIGS. 18 and 19). A lens 21e forming the imaging optical system 21 is disposed on the central axis A between apexes of the rectangular prisms 126a and 126b so that the two beams from the prism assembly 30 are directed toward the photosensitive material FM. In this embodiment, particularly, the principal point of the lens 21e coincides with the nodal point. Thus, the optical head 20 is formed by the prism assembly 30 and the imaging optical system 21 in the eleventh preferred embodiment. The lens 21e is located on the nodal point NP as in the fifth preferred embodiment.

In the eleventh preferred embodiment as in the ninth and the tenth preferred embodiments, two light beams are scanned per unit time to record an image at a high speed.

L. Twelfth Preferred Embodiment

Figure 20:
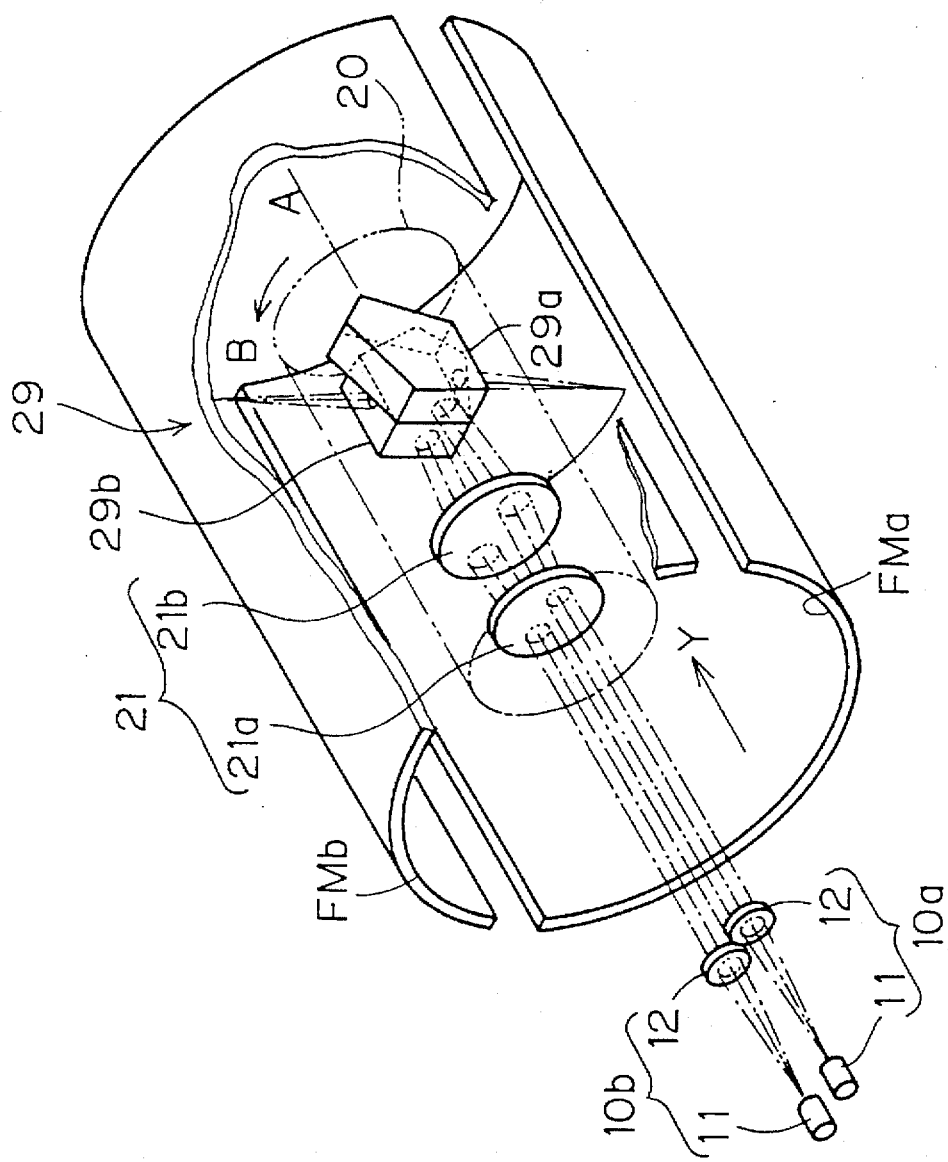
FIG. 20 is a schematic perspective view of an internal drum scanning type image recording apparatus according to a twelfth preferred embodiment of the present invention.

FIG. 20 is a view of an internal drum scanning type image recording apparatus according to a twelfth preferred embodiment of the present invention. The twelfth preferred embodiment is largely different from the ninth preferred embodiment with respect to two points. First, two photosensitive materials FMa and FMb are mounted on the drum. Second, two light beam outputting units 10a and 10b are disposed. The image recording apparatus of the twelfth preferred embodiment is otherwise the same as the image recording apparatus of the ninth preferred embodiment.

The light beam outputting units 10a and 10b are arranged parallel to but off the central axis A. In other words, the positions of the light beam outputting units 10a and 10b are offset from the central axis A. A light beam from one light beam outputting unit impinges upon one prism through the imaging optical system 21 while a light beam from the other light beam outputting unit impinges upon the other prism through the imaging optical system 21. The light beams entering the prisms 29a and 29b are deflected into opposite directions to each other toward the photosensitive materials FMa and FMb. Two types image data are prepared and image data signals which are different from each other are supplied to the light beam outputting units 10a and 10b from the control part in the twelfth preferred embodiment. By switching the image data signals for every half a revolution of the optical head 20, different images are recorded respectively on the photosensitive materials FMa and FMb.

M. Thirteenth Preferred Embodiment

Figure 21:
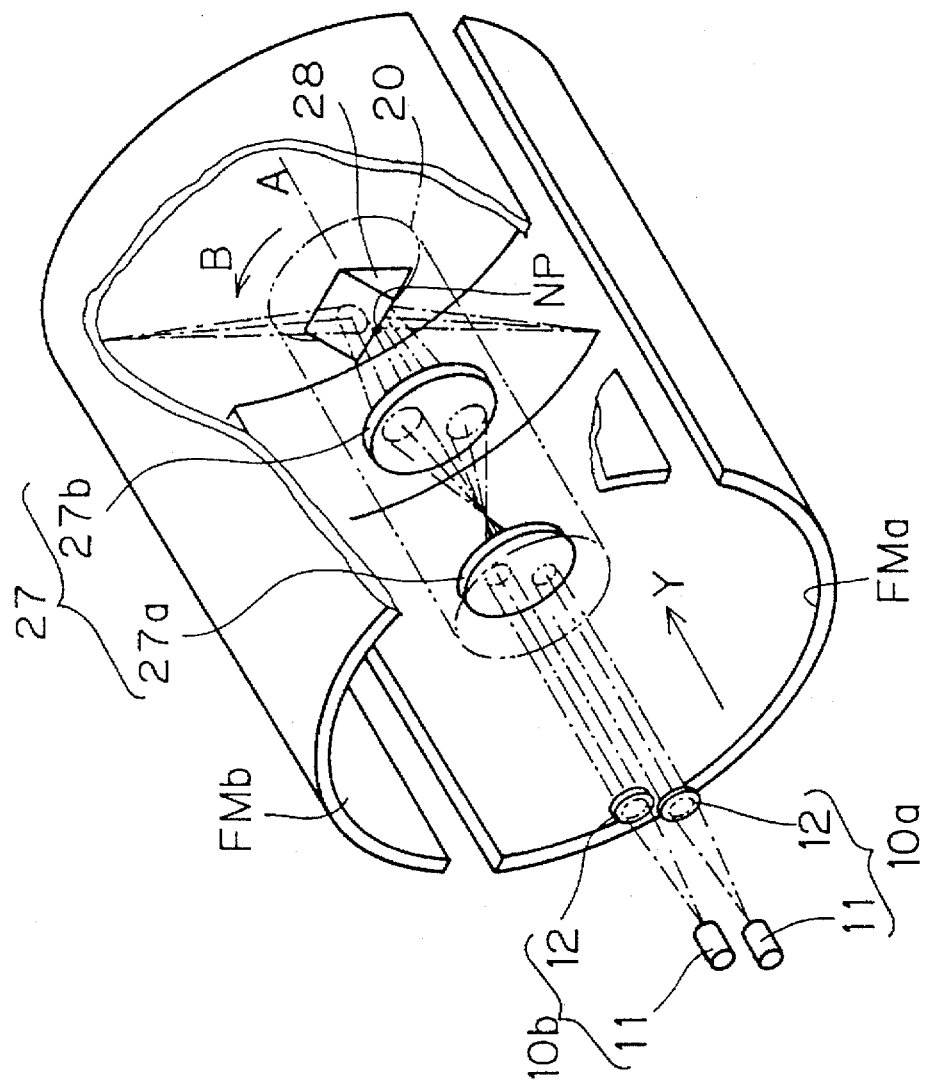
FIG. 21 is a schematic perspective view of an internal drum scanning type image recording apparatus according to a thirteenth preferred embodiment of the present invention.

FIG. 21 is a view of an internal drum scanning type image recording apparatus according to a thirteenth preferred embodiment of the present invention. The thirteenth preferred embodiment is largely different from the tenth preferred embodiment with respect to two points. First, two photosensitive materials FMa and FMb are mounted on the drum. Second, two light beam outputting units 10a and 10b are disposed. The image recording apparatus of the thirteenth preferred embodiment is otherwise the same as the image recording apparatus of the tenth preferred embodiment.

The light beam outputting units 10a and 10b are arranged parallel to but off the central axis A. In other words, the positions of the light beam outputting units 10a and 10b are offset from the central axis A. Light beams from the light beam outputting units 10a and 10b enter the prism 28 through the imaging optical system 21 and reflected by the different reflection surfaces 28a and 28b toward the photosensitive materials FMa and FMb. Two types image data are prepared and image data signals which are different from each other are supplied to the light beam outputting units 10a and 10b from the control part in the thirteenth preferred embodiment. By switching the image data signals for every half a revolution of the optical head 20, different images are recorded respectively on the photosensitive materials FMa and FMb. In the prepress, the different images are yellow, magenta, cyan and black separations.

N. Fourteenth Preferred Embodiment

Figure 22:
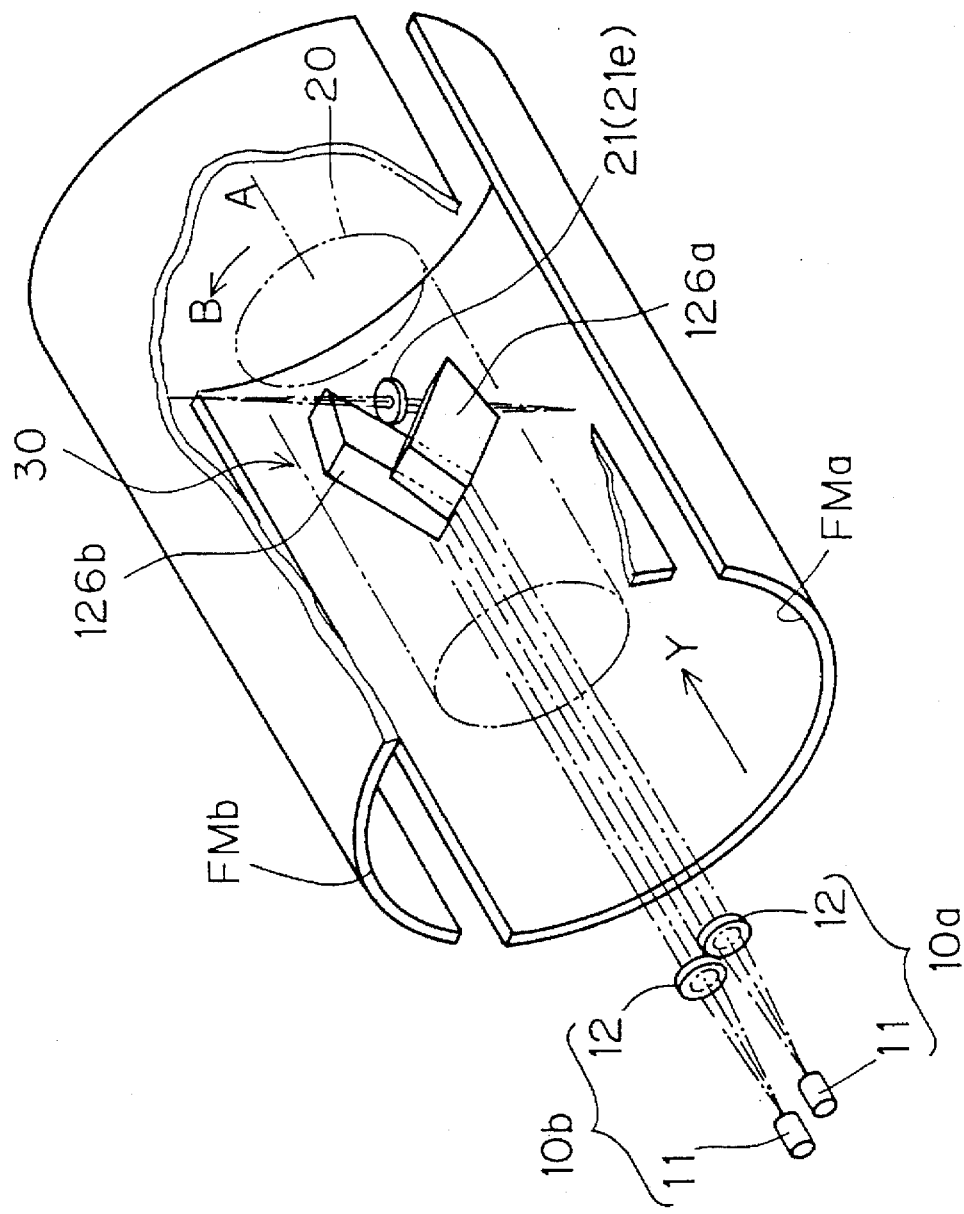
FIG. 22 is a schematic perspective view of an internal drum scanning type image recording apparatus according to a fourteenth preferred embodiment of the present invention.

FIG. 22 is a view of an internal drum scanning type image recording apparatus according to a fourteenth preferred embodiment of the present invention. The fourteenth preferred embodiment is different from the eleventh preferred embodiment with respect to two points. First, two photosensitive materials FMa and FMb are mounted on the drum. Second, two light beam outputting units 10a and 10b are disposed. The image recording apparatus of the fourteenth preferred embodiment is otherwise the same as the image recording apparatus of the eleventh preferred embodiment.

The light beam outputting units 10a and 10b are arranged parallel to but off the central axis A. In other words, the positions of the light beam outputting units 10a and 10b are offset from the central axis A. Light beams from the light beam outputting units 10a and 10b enter the different rectangular prisms 126a and 126b and deflected into opposite directions to each other. The two light beams are then irradiated respectively upon the photosensitive materials FMa and FMb through the imaging optical system 21. Two types image data are prepared and image data signals which are different from each other are supplied to the light beam outputting units 10a and 10b from the control part in the fourteenth preferred embodiment. By switching the image data signals for every half a revolution of the optical head 20, different images are recorded respectively on the photosensitive materials FMa and FMb.

O. Modification (1) Although the tenth and the thirteenth preferred embodiments generate two light beams using the prism 28 which has the two reflection surfaces 28a and 28b, four or eight light beams may be generated by the following modified prisms and scanned over a photosensitive material.

Figure 23:
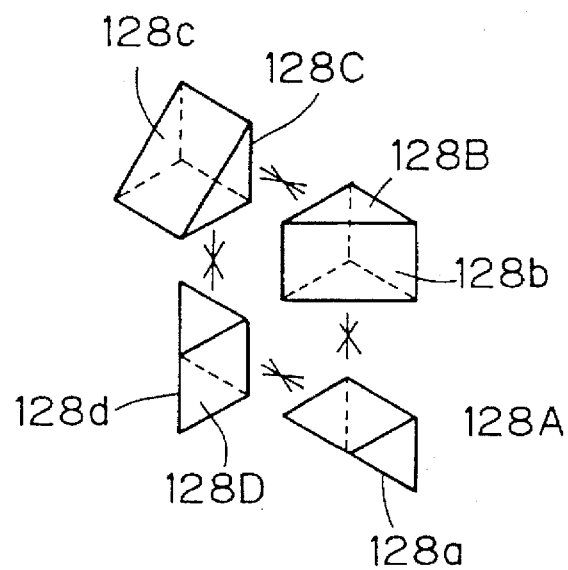
FIG. 23 is an exploded perspective view of a reflection assembly which is formed by four rectangular prisms.
Figure 24:
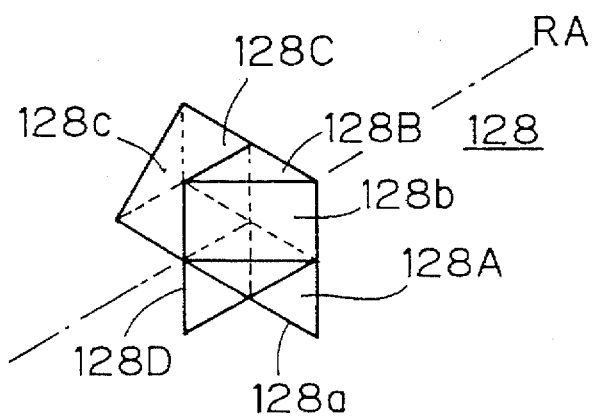
FIG. 24 is a perspective view of a reflection assembly which is formed by four rectangular prisms.
Figure 25:
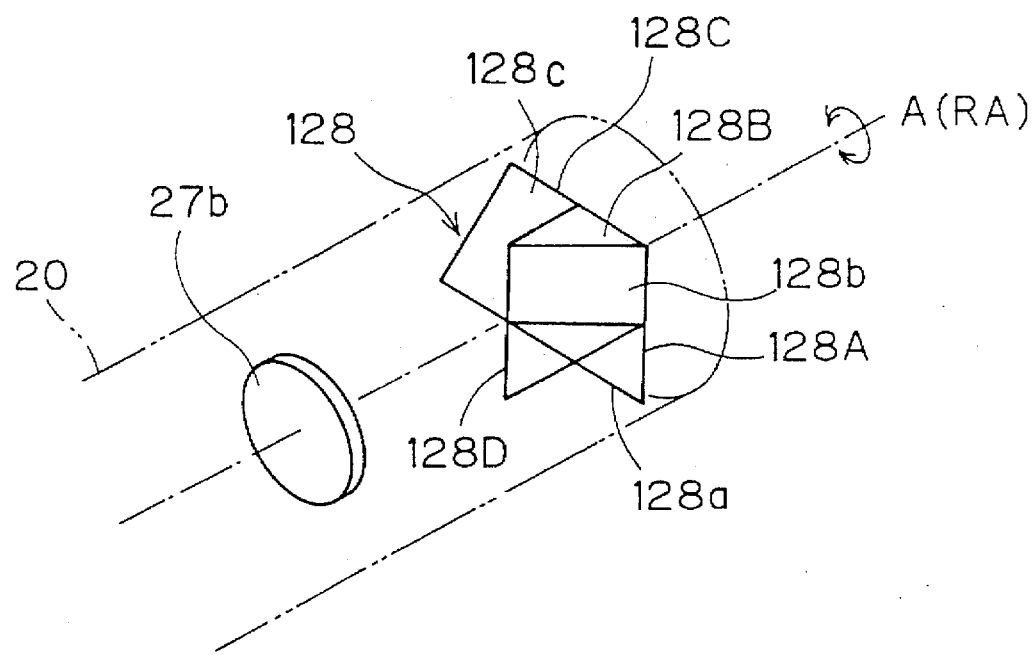
FIG. 25 is a view of an optical head which includes the reflection assembly of FIG. 24.
Figure 26:
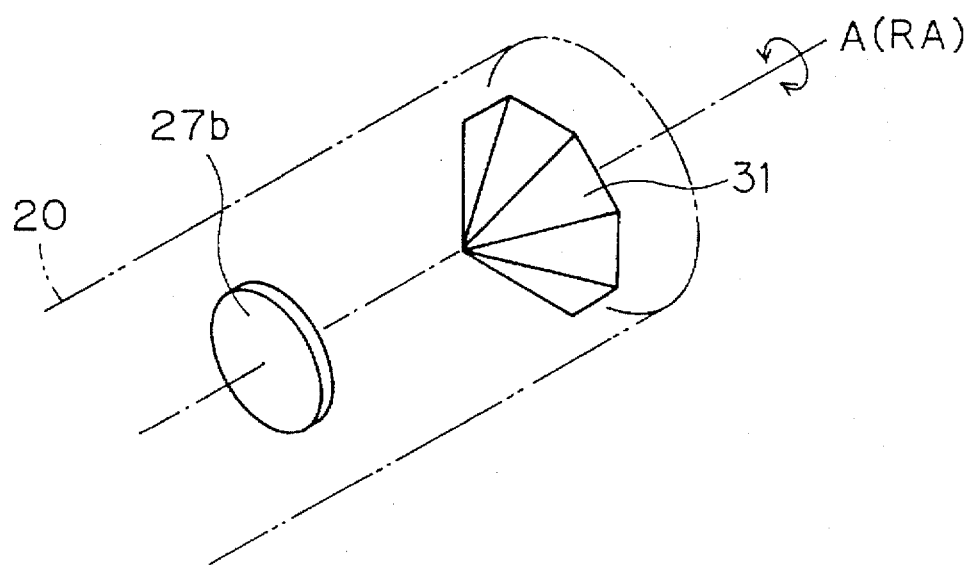
FIG. 26 is a view of an optical head which includes a reflection assembly of a polygonal pyramid shape having eight reflection surfaces.
Figure 27:
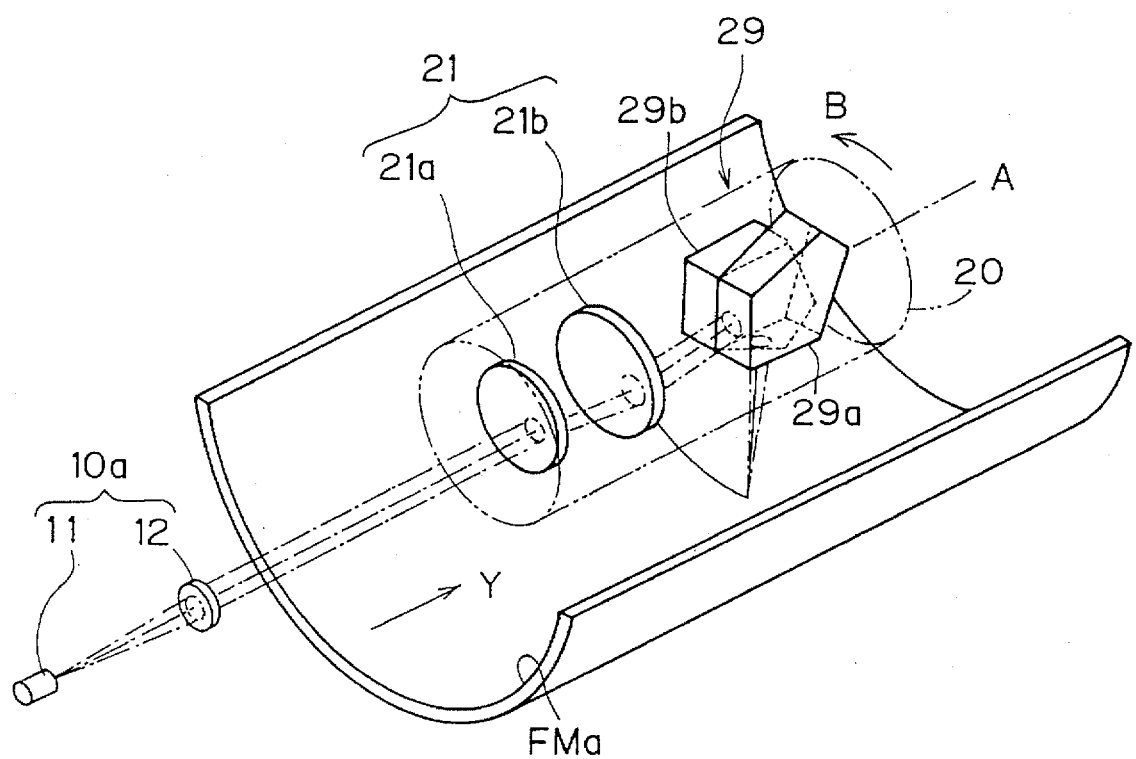
FIG. 27 is a perspective view of a modified version of the internal drum scanning type image recording apparatus of the twelfth preferred embodiment of the present invention.

One modified prism is a prism assembly 128 (FIG. 24) which is formed by combining four similarly shaped rectangular prisms 128A, 128B, 128C and 128D with each other as shown in FIG. 23. Reflection surfaces 128a, 128b, 128c and 128d of the prism assembly 128 are symmetrical in configuration with respect to an axis RA and inclined at about 45 degrees with respect to the axis RA. Hence, when the axis RA of symmetry of the prism assembly 128 coincides with the central axis A as shown in FIG. 25, one light beam passing through the lens 27b of the imaging optical system 21 and entering the prism assembly 128 is separated into four light beams which are deflected into four directions.

Alternatively, four light beam outputting units may be disposed and four light beams from the four light beam outputting units may be directed onto the reflection surfaces so that four deflected light beams are generated.

The other modified prism is a prism 31 of a polygonal pyramid shape which has eight reflection surfaces which are symmetrical with respect to the axis RA. Using the prism 31, eight light beams are generated.

Thus, by using a prism or a prism assembly having a plurality of reflection surfaces as deflecting means and forming the optical head 20 by combining such deflecting means and the imaging optical system 21, it is possible to scan an increased number of light beams over a photosensitive material and record an image at a higher speed.

(2) If modified to mount a further photosensitive material on the drum in a faced relation with the photosensitive material FM and scan a light beam over the two photosensitive materials, the image recording apparatuses of the ninth to the eleventh preferred embodiments record the same image on the two photosensitive materials at the same time.

(3) Although different images are recorded on two photosensitive materials at the same time in the twelfth to the fourteenth preferred embodiments, it is also possible in these preferred embodiments to mount only one photosensitive material on the drum and record an image by operating only one of the two light beam outputting units.

While the invention has been described in detail, the foregoing description is in all aspects illustrative and not restrictive. It is understood that numerous other modifications and variations can be devised without departing from the scope of the invention.

I claim:

1. An internal drum scanning type image recording apparatus for scanning at least one light beam over an inner surface of a cylindrical member and exposing a recording medium which is held on said inner surface to record an image on said recording medium, said cylindrical member having a central axis, said apparatus comprising:

light beam outputting means for outputting a light beam along said central axis of said cylindrical member into the inner space of said cylindrical member;

an optical head including deflecting means for deflecting said light beam from said light beam outputting means toward said inner surface of said cylindrical member and an imaging optical system for focusing said light beam from said light beam outputting means on said recording medium, said imaging optical system being disposed so that a nodal point of said imaging optical system is located at or close to a point on said central axis which is nearest a beam irradiation position on said recording medium, said imaging optical system and said deflecting means being disposed inside said cylindrical member in such a manner that said deflecting means and said imaging optical system are rotatable as one unit about said central axis; and optical head driving means for rotating said optical head about said central axis and scanning said light beam from said optical head over said recording medium.

2. The apparatus of claim 1, wherein said deflecting means is formed by a prism or a mirror unit which has an even number of reflection surfaces to deflect said light beam from said light beam outputting means approximately 90 degrees.

3. The apparatus of claim 1, wherein said imaging optical system is disposed between said light beam outputting means and said deflecting means on said central axis.

4. The apparatus of claim 3, wherein said imaging optical system is formed by a meniscus lens which has a convex surface directed toward said light beam outputting means.

5. The apparatus of claim 2, wherein said deflecting means is formed by a prism and said imaging optical system is disposed between said deflecting means and said recording medium.

6. The apparatus of claim 5, wherein said imaging optical system is formed by a meniscus lens which has a convex surface directed toward said light beam outputting means.

7. The apparatus of claim 2, wherein said deflecting means is a mirror unit which is formed by two reflection mirrors and said imaging optical system is disposed at the center of wobble of said optical head.

8. The apparatus of claim 1, wherein said deflecting means is formed by a reflection mirror and an afocal optical system which has a magnification of 1.

9. The apparatus of claim 8, wherein first and second lenses are disposed so that a combination of said first and second lenses functions as said afocal optical system as well as said second lens functions as said imaging optical system.

10. The apparatus of claim 1, wherein said deflection means is a pentaprism assembly which is formed by combining a plurality of pentaprisms, said deflection means being disposed on said central axis so that a boundary between said pentaprisms is located on a principal ray of the light beam from said light beam outputting means.

11. The apparatus of claim 2, wherein said deflection means is a prism having a plurality of reflection surfaces and an afocal optical system having a magnification of 1, said prism being located on said central axis so that said reflection surfaces separate the light beam from said light beam outputting means into a plurality of light beams and direct said separated light beams toward different directions.

12. The apparatus of claim 11, wherein first and second lenses are disposed so that a combination of said first and second lenses functions as said afocal optical system as well as said second lens functions as said imaging optical system.

13. The apparatus of claim 1, wherein said deflection means is a prism assembly which is formed by combining a plurality of right-angle prisms, said deflection means being disposed on said central axis so that a boundary between said right-angle prisms is located on a principal ray of the light beam from said light beam outputting means, said right-angle prisms each having an even number of reflection surfaces.

14. The apparatus of claim 13, wherein said imaging optical system is a single lens which is located on said central axis so that the principal point of said lens coincides with said nodal point.

15. The apparatus of claim 1, wherein said deflection means is a pentaprism assembly which is formed by combining a plurality of pentaprisms and said light beam outputting means includes a plurality of light beam outputting units which are disposed so that light beams from said light beam outputting units each enter said different pentaprisms.

16. The apparatus of claim 2, wherein said deflection means is a prism having a plurality of reflection surfaces and an afocal optical system having a magnification of 1 and said light beam outputting means includes a plurality of light beam outputting units which are disposed so that light beams from said light beam outputting units each enter said different reflection surfaces.

17. The apparatus of claim 16, wherein first and second lenses are disposed so that a combination of said first and second lenses functions as said afocal optical system as well as said second lens functions as said imaging optical system.

18. The apparatus of claim 1, wherein said deflection means is a prism assembly which is formed by combining a plurality of right-angle prisms and said light beam outputting means includes a plurality of light beam outputting units which are disposed so that light beams from said light beam outputting units each enter said different right-angle prisms, said right-angle prisms each having an even number of reflection surfaces.

19. The apparatus of claim 18, wherein said imaging optical system is a single lens which is located on said central axis so that the principal point of said lens coincides with said nodal point.

* * * * *